US010890695B2

(12) United States Patent
Piskunov et al.

(10) Patent No.: US 10,890,695 B2
(45) Date of Patent: Jan. 12, 2021

(54) COMPOUND LENS AND DISPLAY DEVICE HAVING THE SAME

(71) Applicant: SAMSUNG ELECTRONICS CO., LTD., Suwon-si (KR)

(72) Inventors: Dmitriy Evgenievich Piskunov, Moscow region (RU); Nikolay Viktorovich Muravev, Moscow region (RU); Jae-yeol Ryu, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 16/069,397

(22) PCT Filed: Jan. 9, 2017

(86) PCT No.: PCT/KR2017/000242
§ 371 (c)(1),
(2) Date: Jul. 11, 2018

(87) PCT Pub. No.: WO2017/122972
PCT Pub. Date: Jul. 20, 2017

(65) Prior Publication Data
US 2019/0025475 A1   Jan. 24, 2019

(30) Foreign Application Priority Data

Jan. 12, 2016 (RU) .................................. 2016100444
Nov. 4, 2016 (KR) ........................ 10-2016-0146905

(51) Int. Cl.
*G02B 3/08* (2006.01)
*G02B 7/28* (2006.01)
(Continued)

(52) U.S. Cl.
CPC ................. *G02B 3/08* (2013.01); *G02B 1/04* (2013.01); *G02B 3/10* (2013.01); *G02B 7/28* (2013.01);
(Continued)

(58) Field of Classification Search
CPC ... G02B 3/08; G02B 1/04; G02B 3/10; G02B 7/28; G02B 25/00; G02B 25/04;
(Continued)

(56) References Cited

U.S. PATENT DOCUMENTS

| 5,448,312 A | 9/1995 | Roffman et al. |
| 5,708,641 A | 1/1998 | Choi et al. |

(Continued)

FOREIGN PATENT DOCUMENTS

| CN | 1154542 A | 7/1997 |
| EP | 0592578 B1 | 9/1999 |

(Continued)

OTHER PUBLICATIONS

International Search Report dated Apr. 14, 2017, issued by the International Searching Authority in counterpart International Patent Application No. PCT/KR2017/000242 (PCT/ISA/210).

(Continued)

*Primary Examiner* — William Choi
(74) *Attorney, Agent, or Firm* — Sughrue Mion, PLLC

(57) ABSTRACT

Provided are a compound lens and a display device including the same. The compound lens may improve image quality by providing a higher resolution in a central image region and a lower resolution in a peripheral image region. The compound lens includes a central lens portion and at least one peripheral lens portion, the at least one peripheral lens portion surrounds the central lens portion, the central lens portion has a first focal length, the at least one periph- (Continued)

eral lens portion has a second focal length, and the first focal length is greater than the second focal length.

14 Claims, 33 Drawing Sheets

(51) Int. Cl.
G02B 25/04 (2006.01)
G02B 1/04 (2006.01)
G02B 27/01 (2006.01)
G02B 25/00 (2006.01)
G02B 3/10 (2006.01)
G02B 30/00 (2020.01)

(52) U.S. Cl.
CPC ............ *G02B 25/00* (2013.01); *G02B 25/04* (2013.01); *G02B 27/0172* (2013.01); *G02B 1/041* (2013.01); *G02B 30/00* (2020.01); *G02B 2027/0147* (2013.01)

(58) Field of Classification Search
CPC .... G02B 27/0172; G02B 1/041; G02B 27/22; G02B 2027/0147
USPC .......................................... 359/741, 742, 796
See application file for complete search history.

(56) References Cited

U.S. PATENT DOCUMENTS

| | | |
|---|---|---|
| 5,715,031 A | 2/1998 | Roffman et al. |
| 5,777,803 A | 7/1998 | Ju et al. |
| 6,409,141 B1 | 6/2002 | Yamazaki et al. |
| 8,256,895 B2 | 9/2012 | Del Nobile |
| 9,529,194 B2 | 12/2016 | Yoo et al. |
| 2005/0046956 A1 | 3/2005 | Gruhlke |
| 2007/0019157 A1 | 1/2007 | Hillis et al. |
| 2012/0162486 A1 | 6/2012 | Asakura et al. |
| 2015/0185480 A1 | 7/2015 | Ouderkirk et al. |

FOREIGN PATENT DOCUMENTS

| | | |
|---|---|---|
| EP | 1168317 A1 | 1/2002 |
| EP | 3 370 099 A1 | 9/2018 |
| GB | 2304971 A | 3/1997 |
| JP | 6-46356 A | 2/1994 |
| JP | 3679601 B2 | 8/2005 |
| KR | 10-2015-0059085 A | 5/2015 |

OTHER PUBLICATIONS

Written Opinion dated Apr. 14, 2017, issued by the International Searching Authority in counterpart International Patent Application No. PCT/KR2017/000242 (PCT/ISA/237).
Communication dated Oct. 31, 2018, issued by the European Patent Office in counterpart European Application No. 17738601.8.
Communication dated Jan. 19, 2020 issued by the State Intellectual Property Office of P.R. China in counterpart Chinese Application No. 201780006425.5.
Communication dated Sep. 2, 2020, issued by the State Intellectual Property Office of P.R. China in Chinese Application No. 201780006425.5.

151

152

| ORIGINAL IMAGE | TRANSFORMED IMAGE (IMAGE ON DISPLAY) |

| DISTORTED IMAGE OF ORIGINAL IMAGE BY COMPOUND LENS | TRANSFORMED IMAGE (DISTORTION COMPENSATION) |

COMPOUND LENS AND DISPLAY DEVICE HAVING THE SAME

CROSS-REFERENCE TO RELATED APPLICATIONS

This application is a national stage entry of International Application No. PCT/KR2017/00242, filed on Jan. 9, 2017, which is based on and claims priority under 35 U.S.C. § 119 to Korean Patent Application No. 10-2016-0146905, filed on Nov. 4, 2016, in the Korean Intellectual Property Office, and Russian Patent Application No. 2016100444, filed Jan. 12, 2016, in the Russian Patent Office, the disclosures of which are incorporated herein by reference in their entireties.

BACKGROUND

1. Field

The present disclosure relates to display technology, and more particularly, to a display device including a compound lens used to form images having different resolutions (i.e., different pixel densities), thereby enhancing a three-dimensional (3D) effect sensed by a viewer.

2. Description of Related Art

A virtual reality device generally includes a helmet or glasses and has an optical device in front of each eye of a user wearing the device. There is also a monocular device having a built-in micro display and having an optical device in front of only one eye of a user. In most cases, a related-art virtual reality helmet or glasses includes a display and a lens located in front of each human eye. The lens serves as an eyepiece that projects an image formed by the display on the retina of the human eye.

A well-known device has an optical device worn on the head of a user and located in front of each eye, a display, and a frame having a mechanical part for mounting and moving the optical device and display. The optical device refers to an eyepiece located in front of each eye of the user. A left-eye eyepiece including at least one lens projects an image formed by the half of the display on the left eye of the user. A right-eye eyepiece operates in the same way on the right eye of the user.

However, the above lenses are designed to provide approximately the same resolution in a central image region and a peripheral image region. In particular, the resolution of the peripheral image region is higher than the resolution of the human eye, while the resolution of the central image region is considerably lower than the resolution of the human eye. Therefore, these lenses generate an excessive resolution in the peripheral image region and an insufficient resolution in the central image region. Thereby, it reduces the sharpness of displayed images and reduces the feel of a 3D scene to a viewer.

SUMMARY

Provided is a compound lens that may improve image quality by providing a higher resolution in a central image region and a lower resolution in a peripheral image region.

Provided is a display device that may improve image quality by providing a higher resolution in a central image region and a lower resolution in a peripheral image region.

According to an aspect of the present disclosure, a compound lens includes: a central lens portion having a first focal length; and at least one peripheral lens portion having a second focal length and surrounding the central lens portion, wherein the first focal length is greater than the second focal length.

The central lens portion and the at least one peripheral lens portion may have concentric focal planes.

The central lens portion and the at least one peripheral lens portion may include polymethyl methacrylate (PMMA), glass, or optical plastic.

The central lens portion may have a circular shape and the at least one peripheral lens portion may have an annular shape.

The central lens portion and the at least one peripheral lens portion may be concentrically arranged.

The central lens portion and the at least one peripheral lens portion may form a Fresnel lens together.

The central lens portion may include any one of a convex lens, a concave lens, a biconvex lens, a biconcave lens, a positive meniscus lens, a negative meniscus lens, and a lens having two randomly-curved surfaces.

The at least one peripheral lens portion may include any one of a biconvex lens, a biconcave lens, and a lens having two randomly-curved surfaces.

The central lens portion and the at least one peripheral lens portion may include an optical diffractive element or an optical holographic element.

At least one of the central lens portion and the at least one peripheral lens portion may be coated with a total reflection film configured to increase lens transparency.

The at least one peripheral lens portion may include a plurality of peripheral lens portions surrounding the central lens portion, wherein the plurality of peripheral lens portions may have a focal length fi where "i" is the number of peripheral lens portions and i=1, 2, 3, . . . n and satisfy $f_0 > f_1 > f_2 > f_3 > \ldots > f_n$ where $f_0$ is the first focal length of the central lens portion, and the central lens portion and the plurality of peripheral lens portions may have coincident focal planes.

According to another aspect of the present disclosure, a display device includes: a frame; a processor mounted in the frame and configured to select an image to be displayed to a viewer; a display attached to the frame and configured to display the image selected by the processor; and two compound lenses.

Each of the two compound lenses may include a central lens portion having a first focal length and at least one peripheral lens portion having a second focal length and surrounding the central lens portion, and the first focal length may be greater than the second focal length.

Each of the compound lenses may be installed at the position of the frame facing each eye of the viewer and may be configured to project the half of a displayed image on each eye of the viewer.

The display device may further include a first adjuster configured to adjust an interocular distance for the viewer by moving the compound lens perpendicularly to an optical axis of the compound lens.

The display device may further include a second adjuster configured to change a distance between the display and the compound lens to compensate for a refraction error of the viewer's eyes by moving the compound lens along an optical axis of the compound lens.

The processor may be configured to compensate for image distortion provided by the compound lens by pre-distorting an image displayed by the display.

DETAILED DESCRIPTION

Hereinafter, example embodiments will be described in detail with reference to the accompanying drawings. However, embodiments of the present disclosure may be implemented in various other forms and should not be limited to any structure or function described in the following description. Rather, these embodiments are provided to make the description of the present disclosure detailed and complete. According to the present description, it will be apparent to those of ordinary skill in the art that the scope of the present disclosure covers the embodiments of the present disclosure described herein, regardless of whether the embodiments are implemented independently or in combination with other embodiments of the present disclosure. For example, a device described herein may be practically implemented by using various embodiments. In addition, any embodiment of the present disclosure may be implemented by using one or more components in the appended claims.

The term "example" is used herein to mean "used as an example or illustration". Herein, any embodiment described as "example" should not be construed as "preferable or advantageous over other embodiments".

In addition, directional words such as "central" and "peripheral" are used with reference to the directions of the drawings to be described. Since components of embodiments of the present disclosure are located in different directions, directional terms are used for the purposes of the drawings and do not give any limitation. It will be understood that other embodiments may be used and structural or logical changes may be made without departing from the scope of the present disclosure.

Figure 1:
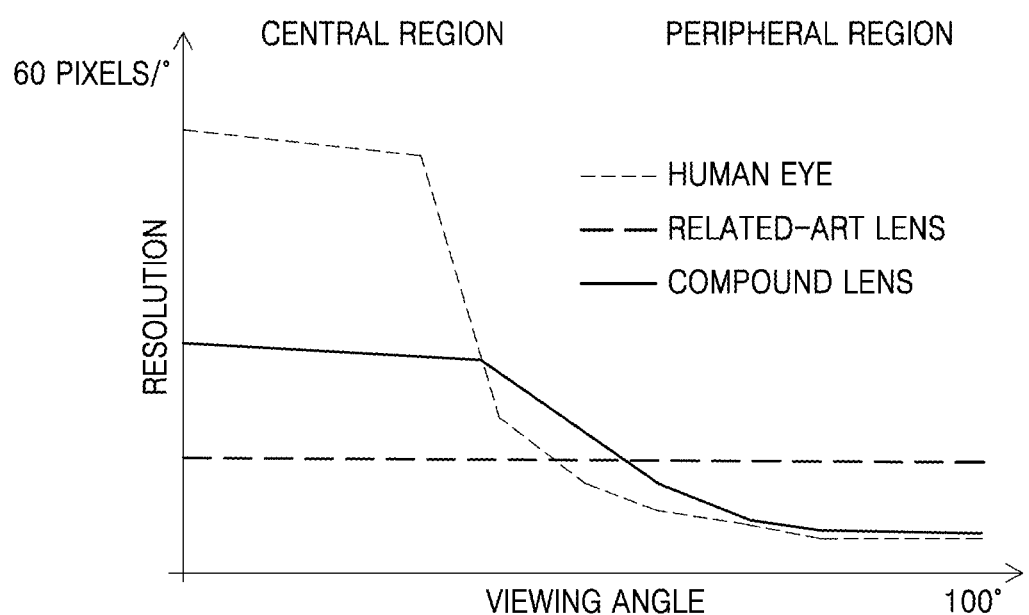
FIG. 1 illustrates the resolutions of a human eye, a related-art lens, and a compound lens as a function of a viewing angle.

FIG. 1 illustrates a resolution change depending on a viewing angle with respect to each of a human eye, a related-art lens, and a compound lens according to an embodiment of the present disclosure.

The human eye has a relatively high resolution in a central region of the viewing angle and a relatively low resolution in a peripheral region of the viewing angle. The related-art lens is designed to have almost the same resolution in the peripheral region and the central region. The compound lens according to an example embodiment may be configured to have a relatively high resolution in a central region of the viewing angle and a relatively low resolution in a peripheral region of the viewing angle. Thereby, it may be matched with the resolution of the human eye.

A virtual reality device may have a viewing angle of 120 degrees or more but the number of display pixels may not be sufficient to satisfy a high resolution through a full viewing angle. As described above, the human eye has a higher resolution in a central image region than in a peripheral image region. Since a related-art single lens has approximately the same resolution (about 15 pixels/°) in the central and peripheral image regions, the resolution of the peripheral image region may be higher than the resolution of the human eye. Also, as illustrated in FIG. 1, the resolution of the central image region is considerably lower than the resolution of the human eye. Thus, the single lens provides an excessive resolution in the peripheral image region and an insufficient resolution in the central image region. To overcome this problem, an example embodiment may redistribute pixels such that the number of pixels in the central image region is greater than the number of pixels in the peripheral image region.

Figure 2:
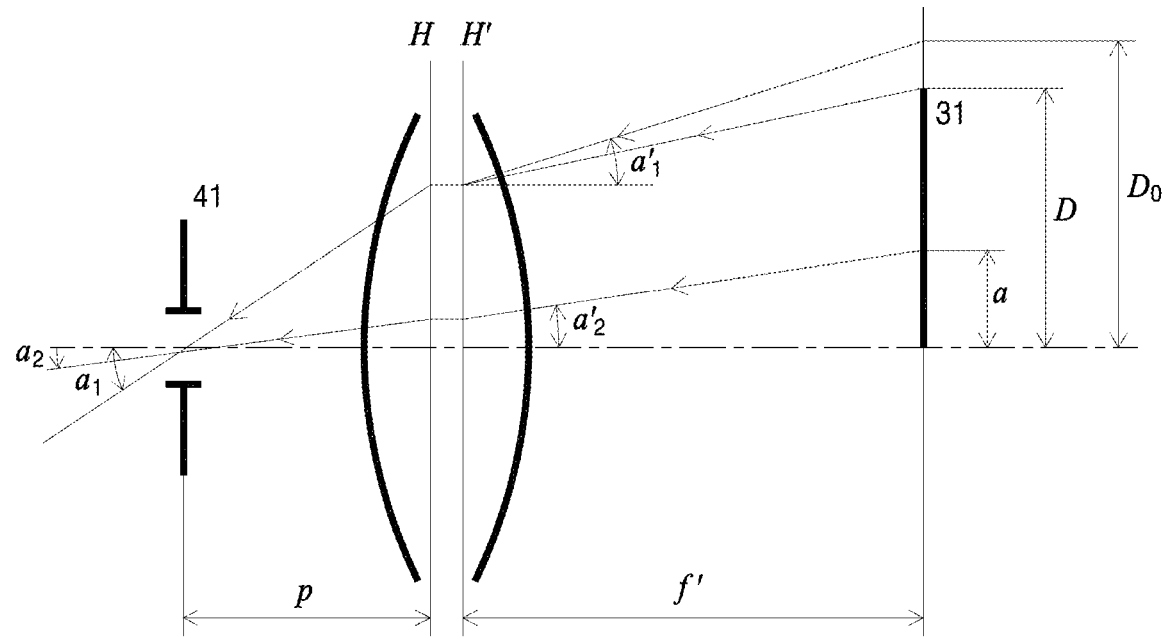
FIG. 2 illustrates the layout of a related-art single lens.

To understand this, consider the characteristics of a single lens for a virtual reality device. Referring to FIG. 2, a viewing angle $2\alpha$ and an angular resolution $\varphi$ are important to a user. A field of view (FOV) represents the maximum angular size of a display seen from an exit pupil. The angular resolution represents the number of pixels seen by the human eye per degree. The following equation is known from a paraxial optical system.

$$tg\alpha'_1 = tg\alpha + \frac{h}{f'} \quad (1)$$

$$D_0 = h - f' tg\alpha'_1$$

Herein, $D_0$ is the height of a paraxial chief ray on an image plane or a display plane, f' is a focal length, and h is the height of a chief ray on a principle plane with respect to the edge of a viewing angle (FOV) and is defined by a pupil position p.

$$h = p \cdot tg\alpha_1 \quad (2)$$

A viewing angle with a sign may be obtained by using $tg\alpha_1'$ of a first equation in a second equation of Equation (1).

$$tg\alpha = \frac{D_0}{f'} \quad (3)$$

The chief ray heights in a paraxial lens and a real lens may be different from each other due to a distortion $\Delta$ defined by the following equation.

$$\Delta = \frac{D}{D_0} - 1 \quad (4)$$

Herein, D is the chief ray height of the image plane. In this case, D is equal to the half of a diagonal of a display 31.

Also, $D_0$ may be obtained from Equation (4).

$$D_0 = \frac{D}{\Delta + 1} \quad (5)$$

The following equation may be obtained by substituting Equation (5) in Equation (3).

$$\alpha_1 = \arctg \frac{D}{(\Delta + 1)f'} \quad (6)$$

In Equation (6), there is a parameter that may be adjusted. It is a focal length f'. A distortion $\Delta$ in a lens depends mainly on a viewing angle (FOV) and an aperture stop position. In a modern virtual reality device, the FOV is about 90 degrees. In this case, an aperture stop may coincide with a pupil. Based on anthropometric data, the pupil position p may be defined as being about 10 mm to about 20 mm away from the lens. This may lead to a barrel distortion of about −25% to about −45%. D may not change in a wide angle. When the value of D is small, an optical system including several components may be required to correct the aberration of a high-power lens. When the value of D is great, it may lead to a large overall dimension.

The angular resolution averaged over the entire FOV may be defined as follows.

$$\varphi = \frac{N}{2\alpha_1} \quad (7)$$

Herein, N denotes the number of pixels across the display diagonal. For a modern advertisement display with a suitable diagonal D, the pixel number N is 3,000 or less.

The angular resolution in a central region of the FOV (defined by $\alpha_2$) may be proportional to a central region (d) of the display.

$$\varphi_0 = \frac{N}{2\alpha_2} \frac{a}{D} \quad (8)$$

As described above, the distortion and the focal length of a normal lens may be selected such that $\varphi = \Phi_0$.

The dependence between $\alpha_2$ and the display region is defined as Equation (9).

$$\alpha_2 = \arctg \frac{a}{(\Delta_0 + 1)f'} \quad (9)$$

Herein, $\Delta_0$ is a distortion in the central image region.

Figure 3:
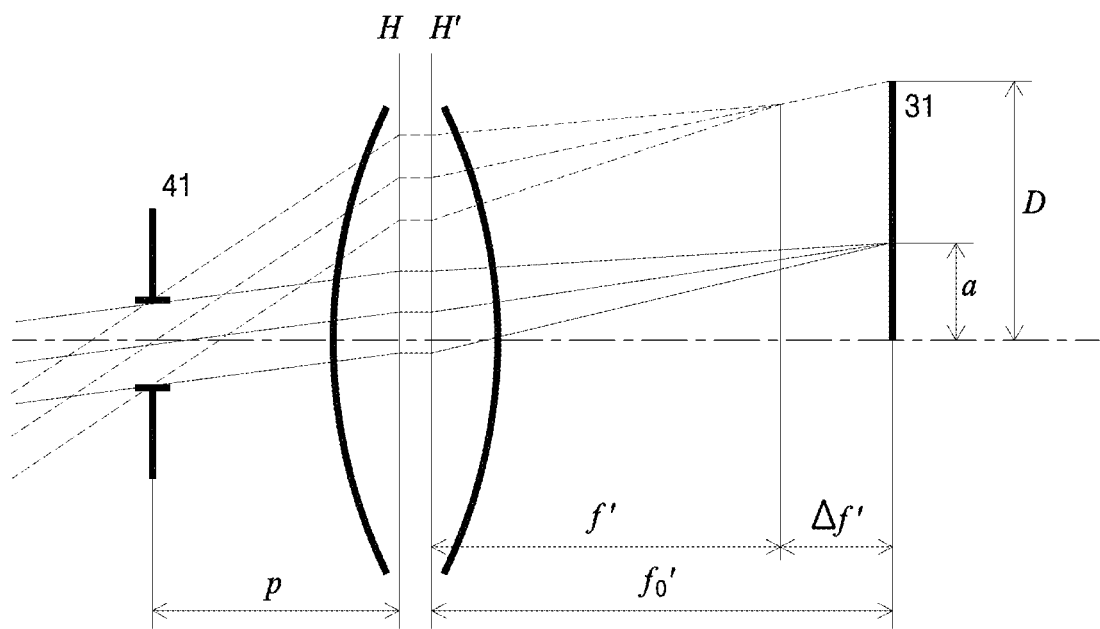
FIG. 3 illustrates a single lens having a central lens portion and a peripheral lens portion having different focal lengths.

Equations (6) to (9) show whether it is necessary to increase the FOV. It may be necessary to reduce the angular resolution or vice versa. It may be important for the user of the virtual reality device to have both the wide angle FOV and the high angular resolution mode at the same time. To have both the FOV and the high-level angular resolution, it may be necessary to refer to Equations (6) and (9). That is, it may be necessary to have different f' in the central image region and the peripheral image region. In this case, one of the image regions may be out of focus and the image sensed by the eyes may be blurred. For example, referring to FIG. 3, the central image region may be located at focus $f_0'$, and the peripheral image region may be out of focus f'.

Figure 4:
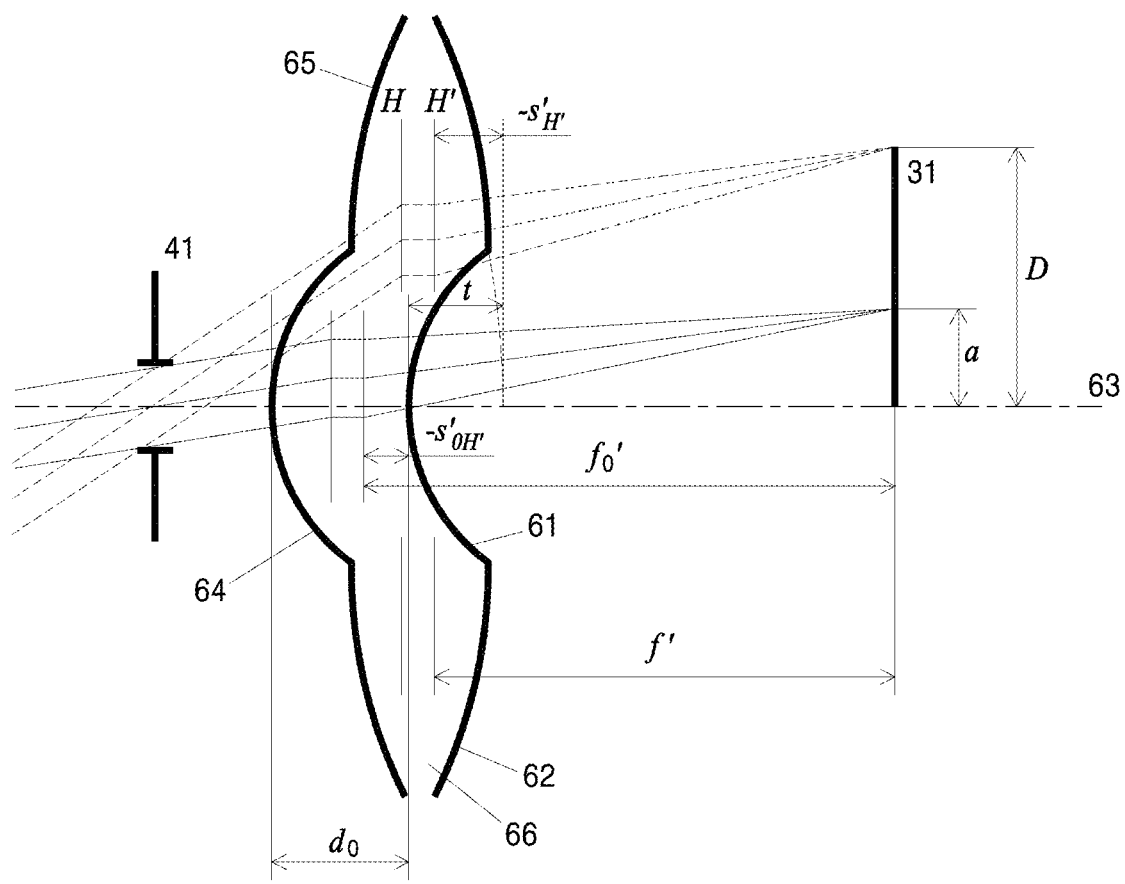
FIG. 4 illustrates a compound lens according to an example embodiment.

FIG. 4 illustrates a compound lens 66 according to an example embodiment. Referring to FIG. 4, in an example embodiment, lens portions located at different positions may have different focal lengths in order to focus light on a central image region and a peripheral image region. Also, the lens portions located at different positions may have different principal planes HH' and $H_0H_0'$. The compound lens 66 according to an example embodiment may include a central lens portion 64 and a peripheral lens portion 65. For example, the central lens portion 64 may have a first focal length, and the peripheral lens portion 65 may have a second focal length. A reference numeral 41 denotes an exit pupil. The compound lens 66 may maintain f' according to Equation (6) and substitute an increased f' in Equation (9) to obtain the same FOV as in a single lens and obtain Equation (8) about an improved angular resolution in the central image region.

Figure 5:
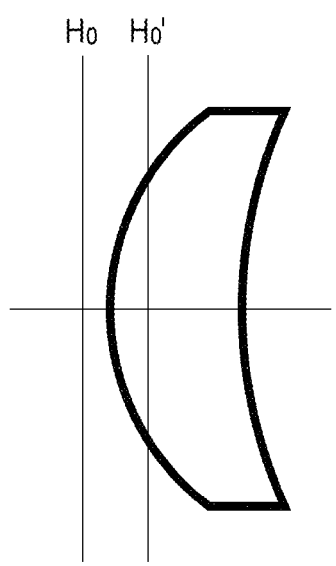
FIG. 5 illustrates a meniscus lens having a principle plane.
Figure 6:
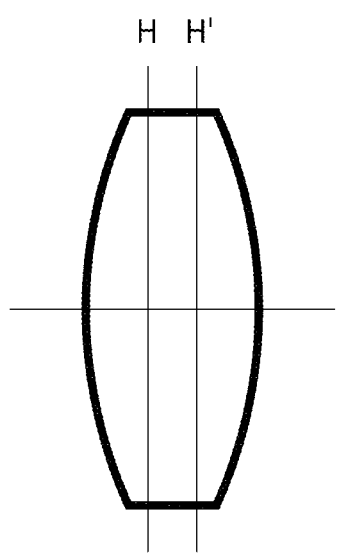
FIG. 6 illustrates a biconvex lens having a principal plane.

The position of the principle plane $H_0H_0'$ may be determined by a meniscus lens (see FIG. 5) as a central lens portion, and the position of the principal plane HH' may be determined by a biconvex lens (see FIG. 6) as a peripheral lens portion. The compound lens 66 may be constructed by a combination thereof. However, this is merely an example, and an in-focus position may be applied in the central image region and the peripheral image region by another combination of lenses.

Figure 7A:
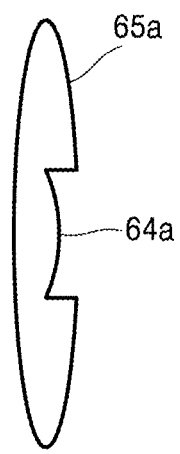
FIGS. 7A to 7X illustrate compound lenses according to various embodiments.
Figure 7B:
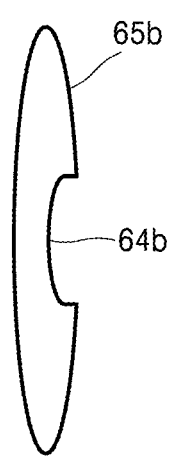
Figure 7C:
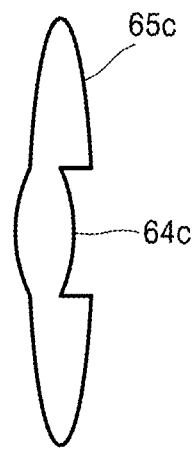
Figure 7D:
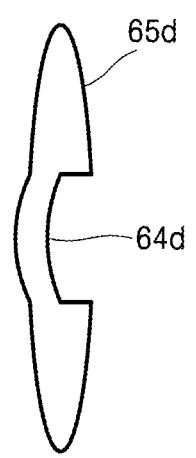
Figure 7E:
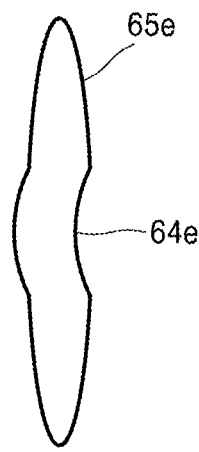
Figure 7F:
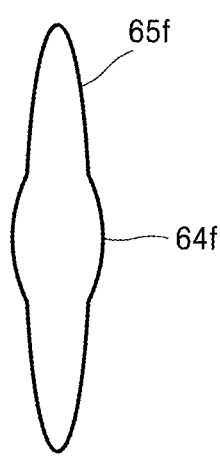

In a compound lens according to an example embodiment, a central lens portion and at least one peripheral lens portion may be formed by using a molding or processing technology. FIGS. 7A to 7X illustrate examples of compound lenses.

As illustrated in FIG. 7A, a central lens portion 64a may include a biconvex lens, and a peripheral lens portion 65a may include a biconvex lens. Any one surface of the central lens portion 64a and the peripheral lens portion 65a may have a continuous convex shape. As illustrated in FIG. 7B, a central lens portion 64b may include a meniscus lens, and a peripheral lens portion 65b may include a biconvex lens. A convex surface of the central lens portion 64b and the peripheral lens portion 65b may have a continuous convex shape. As illustrated in FIG. 7C, a central lens portion 64c may include a biconvex lens, and a peripheral lens portion 65c may include a biconvex lens. Each of both sides of the central lens portion 64c and the peripheral lens portion 65c may have a discontinuous convex surface. As illustrated in FIG. 7D, a central lens portion 64d may include a meniscus lens, and a peripheral lens portion 65d may include a biconvex lens. Each of both sides of the central lens portion 64d and the peripheral lens portion 65d may have a discontinuous surface. As illustrated in FIG. 7E, a central lens portion 64e may include a meniscus lens, and a peripheral lens portion 65e may include a biconvex lens. Compared to FIG. 7D, the central lens portions 64d and 64e may have different thicknesses. As illustrated in FIG. 7F, a central lens portion 64f may include a biconvex lens, and a peripheral lens portion 65f may include a biconvex lens. The maximum thickness of the central lens portion 64f may be greater than the maximum thickness of the peripheral lens portion 65f.

Figure 7G:
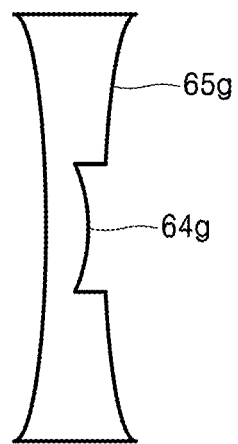
Figure 7H:
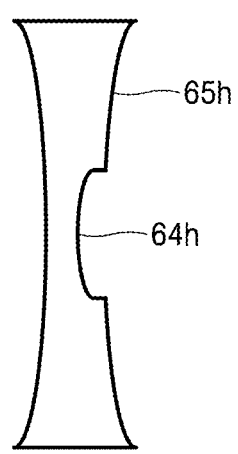
Figure 7I:
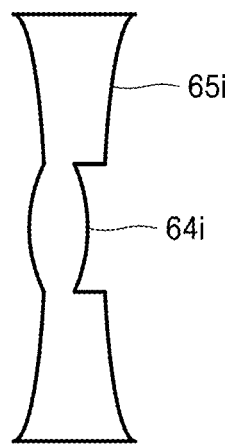
Figure 7J:
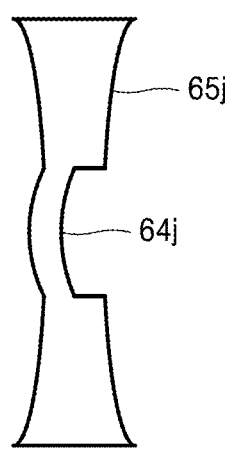
Figure 7K:
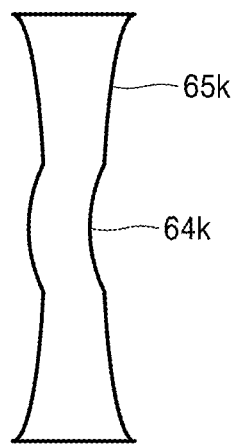
Figure 7L:
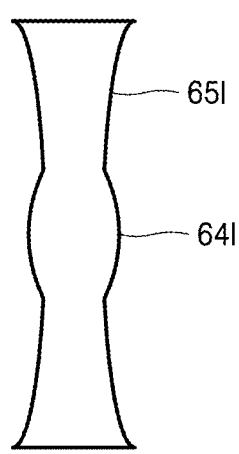

As illustrated in FIG. 7G, a central lens portion 64g may include a meniscus lens, and a peripheral lens portion 65g may include a biconcave lens. A concave surface of the central lens portion 64g and the peripheral lens portion 65g may be continuously formed. As illustrated in FIG. 7H, a central lens portion 64h may include a biconcave lens, and a peripheral lens portion 65h may include a biconcave lens. A concave surface of the central lens portion 64h and the peripheral lens portion 65h may be continuously formed. As illustrated in FIG. 7I, a central lens portion 64i may include a biconvex lens, and a peripheral lens portion 65i may include a biconcave lens. As illustrated in FIG. 7J, a central lens portion 64j may include a meniscus lens, and a peripheral lens portion 65j may include a biconcave lens. As illustrated in FIG. 7K, a central lens portion 64k may include a meniscus lens, and a peripheral lens portion 65k may include a biconcave lens. Compared to FIG. 7J, the central lens portions 64j and 64k may have different thicknesses. As illustrated in FIG. 7L, a central lens portion 64l may include a biconvex lens, and a peripheral lens portion 65l may include a biconcave lens. Each of both sides of the central lens portion 64l may be convex outward than a boundary portion with respect to the peripheral lens portion 65l.

Figure 7M:
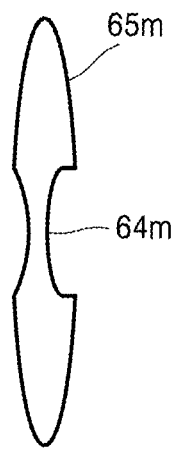
Figure 7N:
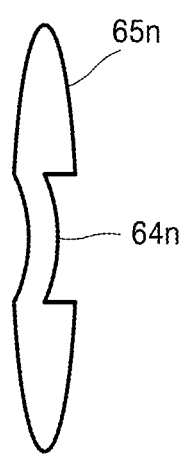
Figure 7O:
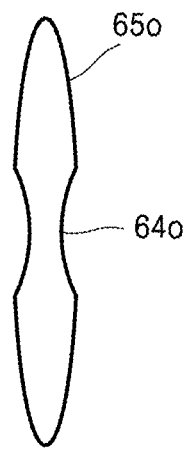
Figure 7P:
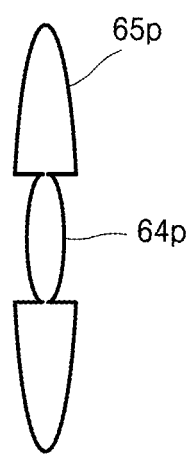
Figure 7Q:
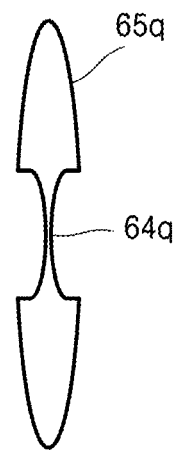
Figure 7R:
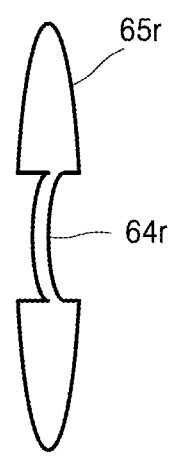
Figure 7S:
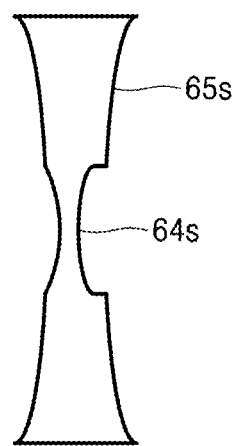
Figure 7T:
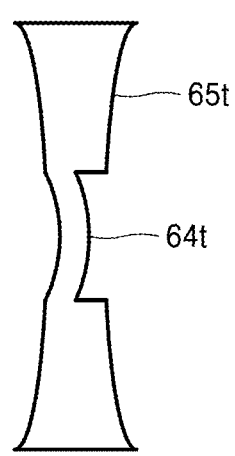

As illustrated in FIG. 7M, a central lens portion 64m may include a biconcave lens, and a peripheral lens portion 65m may include a biconvex lens. As illustrated in FIG. 7N, a central lens portion 64n may include a meniscus lens, and a peripheral lens portion 65n may include a biconvex lens. A convex surface of the central lens portion 64n and the peripheral lens portion 65n may have a discontinuous convex shape. As illustrated in FIG. 7O, a central lens portion 64o may include a biconcave lens, and a peripheral lens portion 65o may include a biconvex lens. As illustrated in FIG. 7P, a central lens portion 64p may include a biconvex lens, and a peripheral lens portion 65p may include a biconvex lens. As illustrated in FIG. 7Q, a central lens portion 64q may include a biconcave lens, and a peripheral lens portion 65q may include a biconvex lens. Compared to FIG. 7M, the central lens portions 64m and 64q may have different thicknesses. As illustrated in FIG. 7R, a central lens portion 64r may include a meniscus lens, and a peripheral lens portion 65r may include a biconvex lens. As illustrated in FIG. 7S, a central lens portion 64s may include a biconcave lens, and a peripheral lens portion 65s may include a biconcave lens. The maximum thickness of the central lens portion 64s may be smaller than the minimum thickness of the peripheral lens portion 65s. As illustrated in FIG. 7T, a central lens portion 64t may include a meniscus lens, and a peripheral lens portion 65t may include a biconcave lens.

Figure 7U:
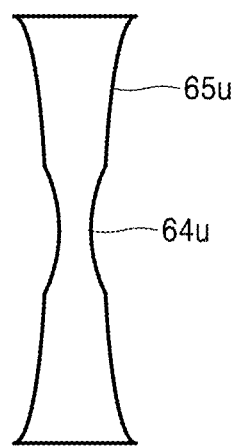
Figure 7V:
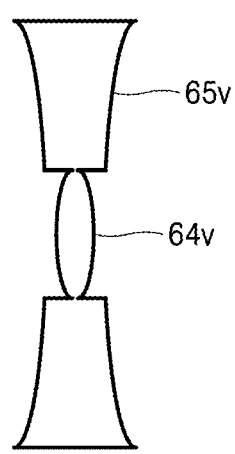
Figure 7W:
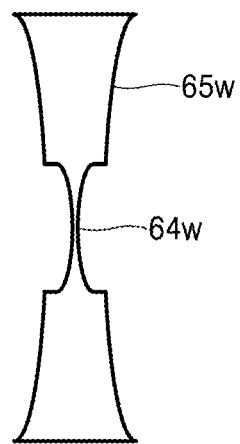
Figure 7X:
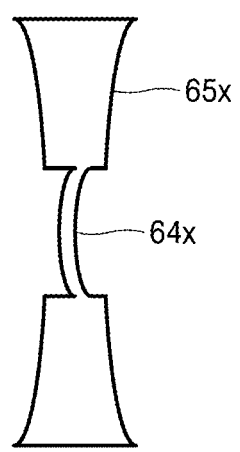

As illustrated in FIG. 7U, a central lens portion 64u may include a biconcave lens, and a peripheral lens portion 65u may include a biconcave lens. As illustrated in FIG. 7V, a central lens portion 64v may include a biconvex lens, and a peripheral lens portion 65v may include a biconcave lens. As illustrated in FIG. 7W, a central lens portion 64w may include a biconcave lens, and a peripheral lens portion 65w may include a biconcave lens. The central thickness of the central lens portion 64w may be relatively very small. As illustrated in FIG. 7X, a central lens portion 64x may include a meniscus lens, and a peripheral lens portion 65x may include a biconcave lens. The central lens portion 64x may have a meniscus shape convex toward the left side in the drawing.

In addition, a central lens portion and a peripheral lens portion may have two randomly-curved surfaces. Some of the combinations of lenses described above may be used as a portion of a compound optical system for aberration correction.

Meanwhile, the condition of an in-focus position may be derived from the geometric consideration illustrated in FIG. 4.

$$s'_{OH'} + f'_0 - t = f' + s'_{H'} - \Delta f' \tag{10}$$

The compound lens 66 may include an incidence surface (IS) where light enters and an exit surface (ES) where light exits. The exit surface (ES) may include a first lens surface 61 of the central lens portion 64 and a second lens surface 62 of the peripheral lens portion 65. In Equation (10), $S'_{OH'}$ and $S'_{H'}$ denote the positions of principal planes $H_0'$ and $H'$ corresponding to the first lens surface 61 and the second lens surface 62. $S'_{OH'}$ may denote the distance between a point where the first lens surface 61 intersects with an optical axis 63 and a point where the second lens surface 62 intersects with the optical axis 63. Herein, the second lens surface 62 may have a continuous virtual surface (VS) having the same curvature, and a position where the virtual surface (VS) intersects with the optical axis 63 will be assumed. $\Delta f'$ denotes an allowable defocusing of the peripheral lens portion 65 with respect to the central lens portion 64 (see FIG. 3), and $\Delta f' = 0$ in FIG. 4. "t" denotes the positional difference between the first lens surface 61 and the second lens surface 62 along the optical axis 63. In the second lens surface 62, "t" may be obtained by assuming a position where the virtual surface (VS) intersects with the optical axis 63.

The result of combining $f_0' - f' = \Delta f'$ into Equation (10) may be represented as follows.

$$s'_{H'} = s'_{OH'} + 2\Delta f' - t \tag{11}$$

Also, the following is known from a geometric optical system.

$$s'_{H'} = f'(d_0 + \Delta d)(1-n)/nr_1$$

$$s'_{OH'} = f'_0 d_0 (1 - n_0)/n_0 r_{01} \tag{12}$$

Herein, $n_0$ and n are the refractive indexes of the central lens portion 64 and the peripheral lens portion 65, and $d_0$ is the thickness of the central lens portion 64 along the optical axis 63. $\Delta d$ denotes the thickness difference between the central lens portion 64 and the peripheral lens portion 65. The thickness of the peripheral lens portion 65 represents the thickness along the optical axis 63 when it is assumed that the peripheral lens portion 65 extends to the optical axis 63.

$r_{01}$ is the radius of the first lens surface 61 of the central lens portion 64 and $r_1$ is the radius of the second lens surface 62 of the peripheral lens portion 65. The first lens surface 61 may represent the exit surface of the central lens portion 64, and the second lens surface 62 may represent the exit surface of the peripheral lens portion 65.

When Equation (12) is substituted into Equation (11), the relationship between the curvature radius of the central lens portion 64 and the curvature radius of the peripheral lens portion 65 may be obtained.

$$r_1 = \frac{f' n_0 r_{01}(d_0 + \Delta d)(1-n)}{f'_0 d_0 (1-n_0)n + 2n n_0 r_{01} \Delta f' - n n_0 t r_{01}} \quad (13)$$

In a compound lens having zero distortion, images may be formed at different scales and a gap may be formed between a central image region and a peripheral image region. For example, when a uniform grid is displayed, the image seen by the eyes will appear as in FIG. 8. In a central lens portion having a great focal length $f_0'$ and a peripheral lens portion having a small focal length f', a central grid cell 102 (i.e., central image region) may be smaller than a peripheral grid cell 103 (i.e., peripheral image region). Also, there may be a gap 101 between the central grid cell 102 and the peripheral grid cell 103. To overcome this problem, it may be necessary to make a compound lens with distortions $\Delta_0$ and $\Delta$ from Equations (6) and (9).

$$\arctg \frac{a}{(\Delta_0 + 1)f_0'} = \arctg \frac{a}{(\Delta + 1)f'} \quad (14)$$

Figure 8:
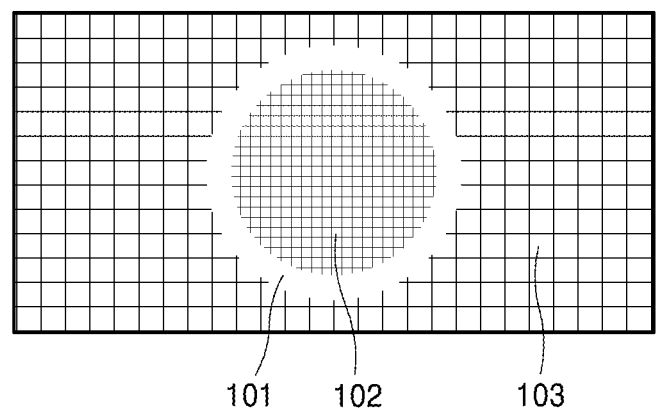
FIG. 8 illustrates a distortion grid for a compound lens having zero distortion.
Figure 9:
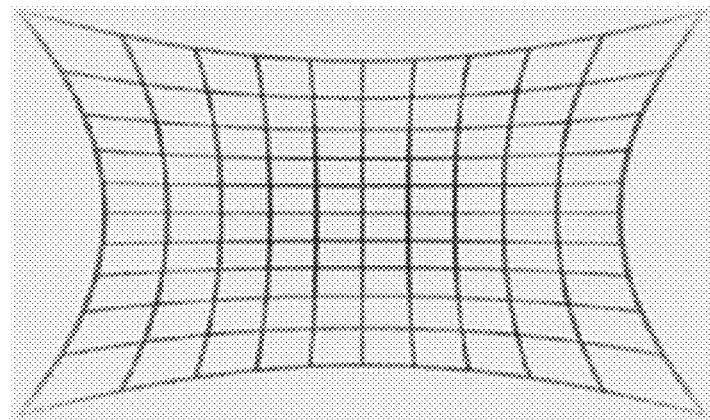
FIG. 9 illustrates a distortion grid for a compound lens without image doubling under full-fill conditions.

When Equation (14) is satisfied, the image of FIG. 8 may be displayed as in FIG. 9.

Figure 10:
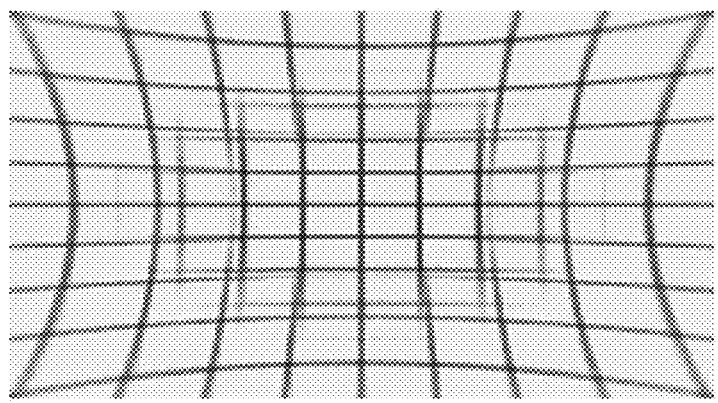
FIG. 10 illustrates a distortion grid for a compound lens with image doubling.
Figure 11:
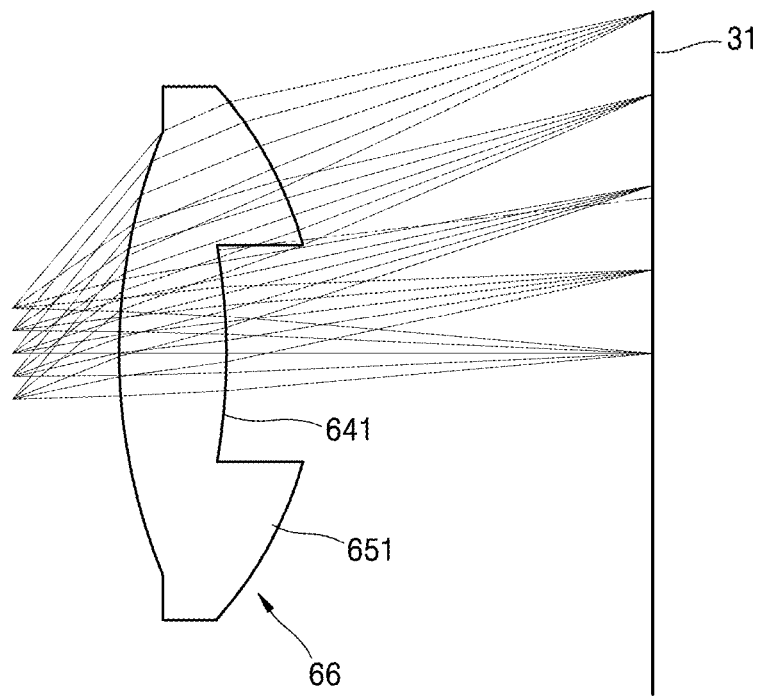
FIG. 11 illustrates a ray path in a compound lens according to an example embodiment.

FIG. 10 illustrates the occurrence of image doubling. To prevent image doubling as illustrated in FIG. 10, Equation (14) may be satisfied for a range "a" depending on the pupil size. As the pupil size increases, the range "a" may increase. FIG. 11 illustrates the layout of a compound lens 66 forming an image illustrated in FIG. 10. The compound lens 66 may include a central lens portion 641 and a peripheral lens portion 651.

Figure 12:
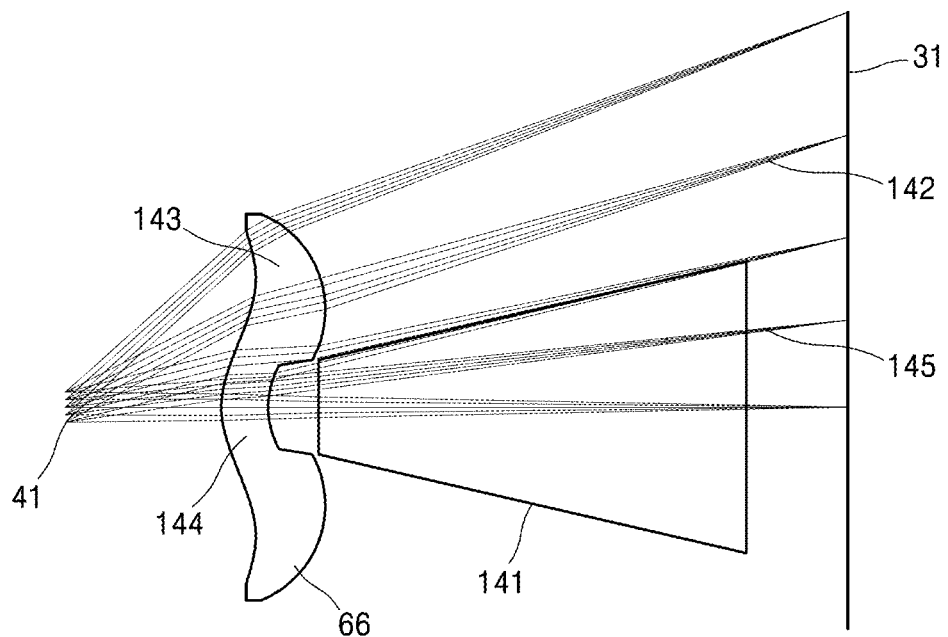
FIG. 12 illustrates a compound lens having an image doubling prevention hood in the shape of a truncated cone.

Another method of removing image doubling is to apply a hood or shield (see FIG. 12). A compound lens 66 illustrated in FIG. 12 may include a central lens portion 144 and a peripheral lens portion 143. A shield 141 may prevent a ray 142 directed toward the peripheral lens portion 143 from passing through the central lens portion 144. Also, on the other hand, a ray 145 directed toward the central lens portion 144 may not pass through the peripheral lens portion 143 due to the shield 141. The shield 141 may, for example, have the shape of a truncated cone. However, the present disclosure is not limited thereto, and the shape of a hood or shield may vary depending on the position of a compound lens.

Figure 13A:
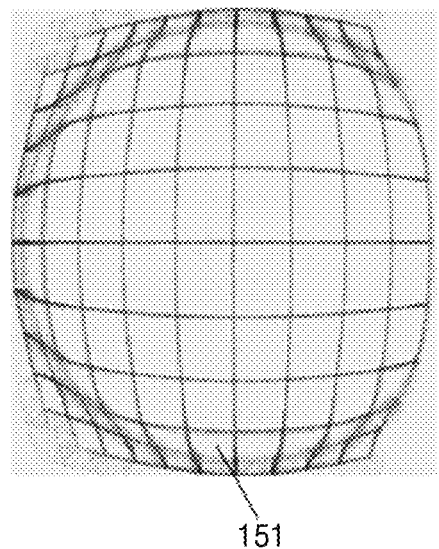
FIGS. 13A and 13B illustrate a pre-distorted image displayed on a display and an image sensed by human eyes.
Figure 13B:
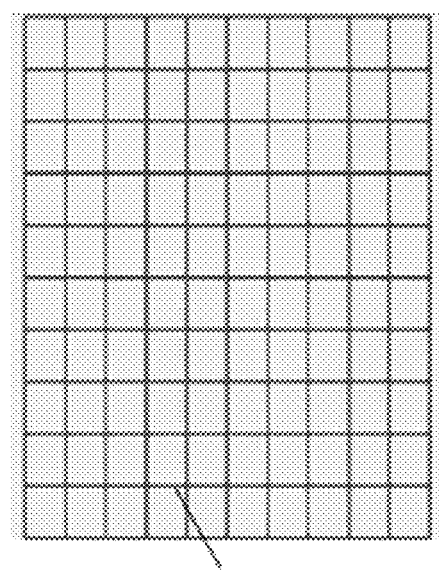

Meanwhile, as illustrated in FIGS. 9 and 10, an image formed by a compound lens may be distorted. The distortion may be compensated for depending on the device and the application. A method of pre-distorting the image formed by the display 31 may be used as a method of compensating for the distortion. For example, FIG. 13A illustrates a pre-distorted image 151, and FIG. 13B illustrates an image 152 sensed by the eyes. To compensate for the distortion illustrated in FIGS. 9 and 10, the distortion may be offset by pre-generating a distortion in the opposite direction as illustrated in FIG. 13A. FIG. 13B illustrates a distortion-compensated image 152.

Figure 14A:
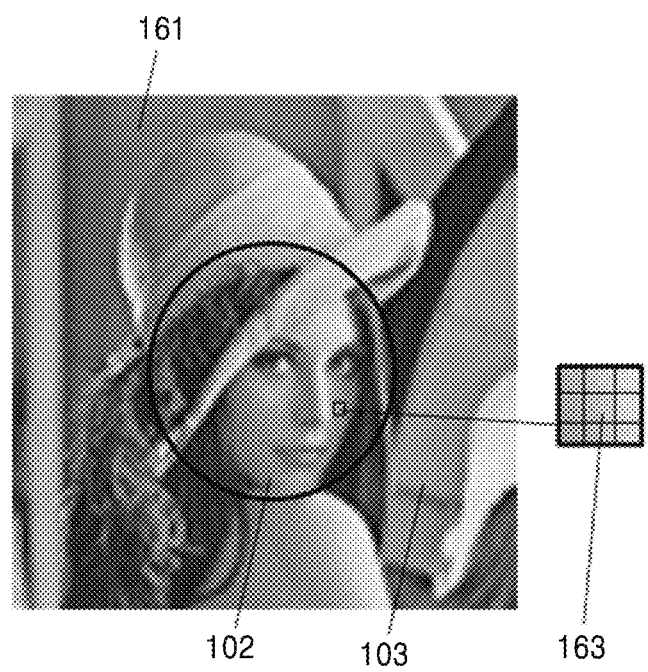
FIGS. 14A and 14B illustrate the result of comparison between images formed by a related-art single lens and a compound lens.
Figure 14B:
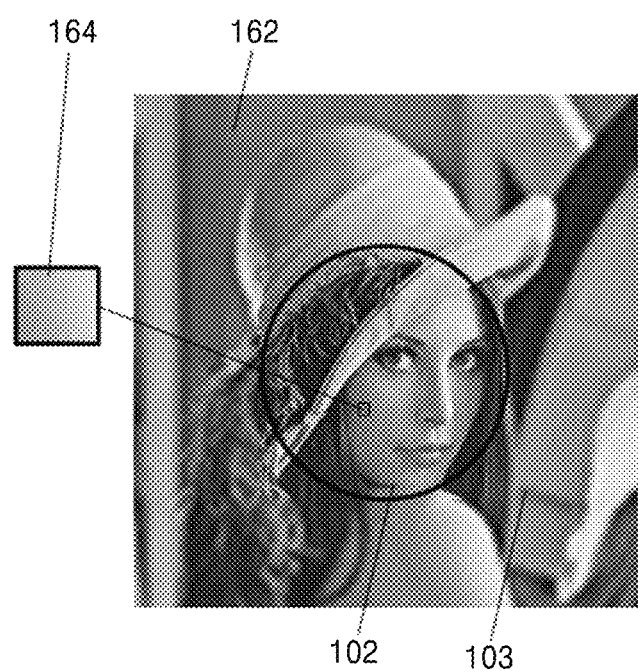

FIG. 14A illustrates an image 161 formed by a related-art single lens. FIG. 14B illustrates an image 162 formed by a compound lens according to an example embodiment. Both the images have the same size, that is, the same FOV. The image 161 has almost the same resolution with respect to a central image region 102 and a peripheral image region 103. The image 162 has a higher resolution in the central image region 102 than in the peripheral image region 103. In FIG. 14B, the resolution of a peripheral image region is not visually clear; however, the image 162 formed by the compound lens according to an example embodiment is clearer than the image 161 formed by the single lens.

The compound lens according to an example embodiment has no screen door effect. When fine lines separating pixels are viewed in a virtual reality image, a screen door effect may be a visual artifact. In FIG. 14A, an image region 163 is an enlarged portion of the central image region 102 formed by the single lens. A gap between pixels may be seen in the image region 163. In FIG. 14B, an image region 164 is an enlarged portion of the central image region 102 formed by the compound lens. Although the display pixel density is the same in the single lens and the compound lens, since the pixel density sensed by the eyes in the compound lens is increased, a screen door effect does not occur.

Figure 15:
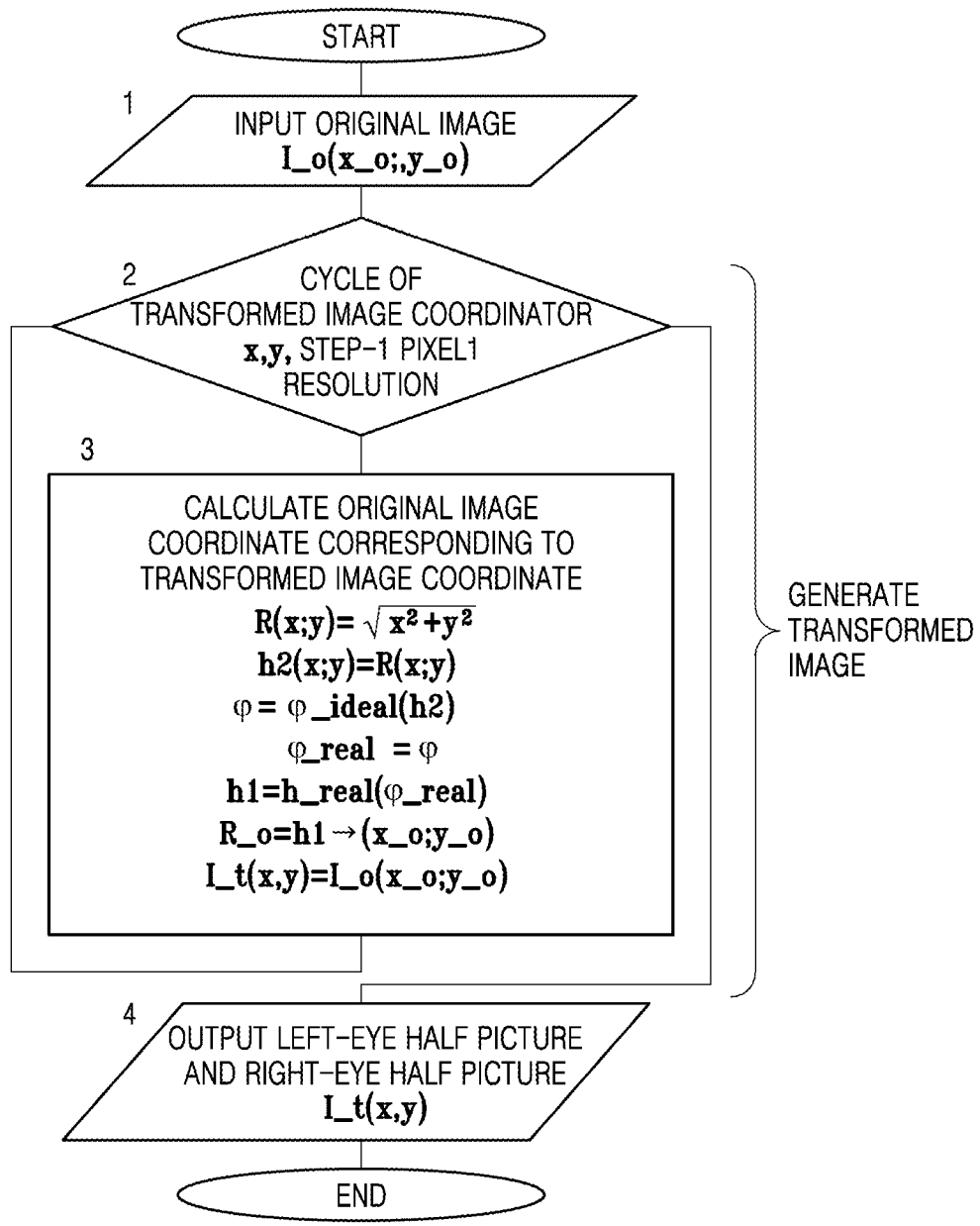
FIG. 15 illustrates a flowchart for a pre-distortion algorithm for forming a transformed image.

FIG. 15 illustrates an example of a pre-distortion algorithm. In the pre-distortion algorithm, the distortion of the compound lens and the chromatic aberration of the compound lens (i.e., the difference between a real ray and an ideal ray) may be considered. An original image may be transformed to offset the effects of lens distortion and chromatic aberration.

Referring to FIG. 15, the pre-distortion algorithm includes an operation of inputting an original image (operation 1), an operation of generating a transformed image (operations 2 and 3), and an operation of outputting the transformed image (operation 4) (see FIG. 15). Operation 1 includes inputting a matrix l_o(x_o;y_o) that is a matrix of the original image when x_o and y_o are the coordinates of the original image. Operation 4 includes outputting a matrix l_t(x,y) that is a matrix of the transformed image when x and y are the coordinates of the transformed image.

Figure 16:
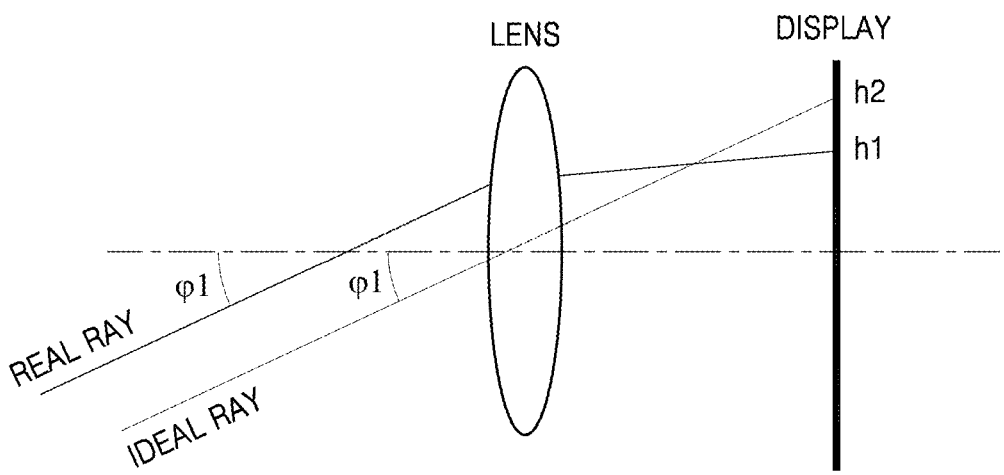
FIG. 16 illustrates ray tracing of an ideal ray and a real ray through a lens.

The coordinate cycle of a display image sets the coordinates (x;y). The coordinate (x_o;y_o) of the original image sets an ideal beam corresponding to a height h2 (see FIG. 16). However, a real beam corresponding to the output of the ideal beam may be generated from another point of the display image corresponding to a height h1. Therefore, in order to form a transformed image on the screen at a point (x;y) corresponding to the height h2, it may be necessary to select a point corresponding to the position of the height h1 from the original image.

Figure 17:
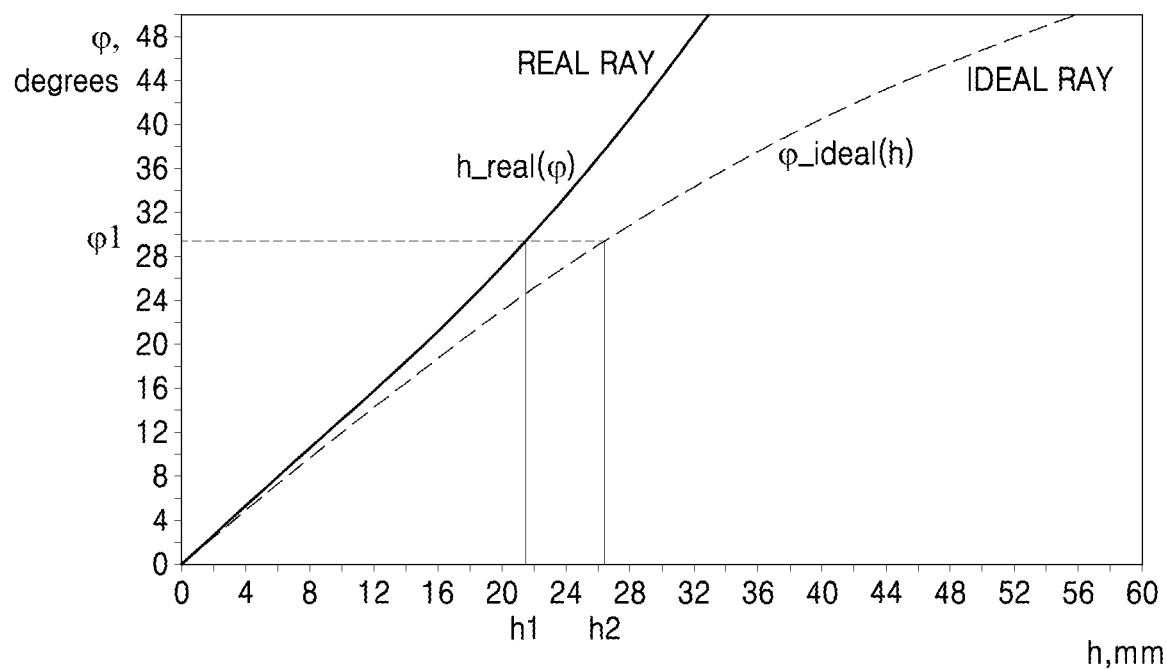
FIG. 17 illustrates the relationship between an ideal ray and a real ray.

The parameter ratio of the ideal beam and the real beam, φ(the viewing angle FOV), h (the height of a beam on the display), φ_ideal(h) (the function of an ideal beam angle from the beam height), and h_real(φ) (the function of a real beam height on the display from the angle) are well-known functions (see FIG. 17).

In order to find a matrix l_t(x;y), it may be necessary to determine l_o(x_o;y_o) (where x_o and y_o are functions of x,y). That is, it may be necessary to determine l_o(x_o(x; y);y_o(x;y)).

The main cycle of the algorithm is the cycle of the image display coordinates (x,y). When the coordinates (x,y) of the center of a new image is known, a radius R may be calculated.

$$R(x;y)=\sqrt{x^2+y^2} \quad (15)$$

Figure 18:
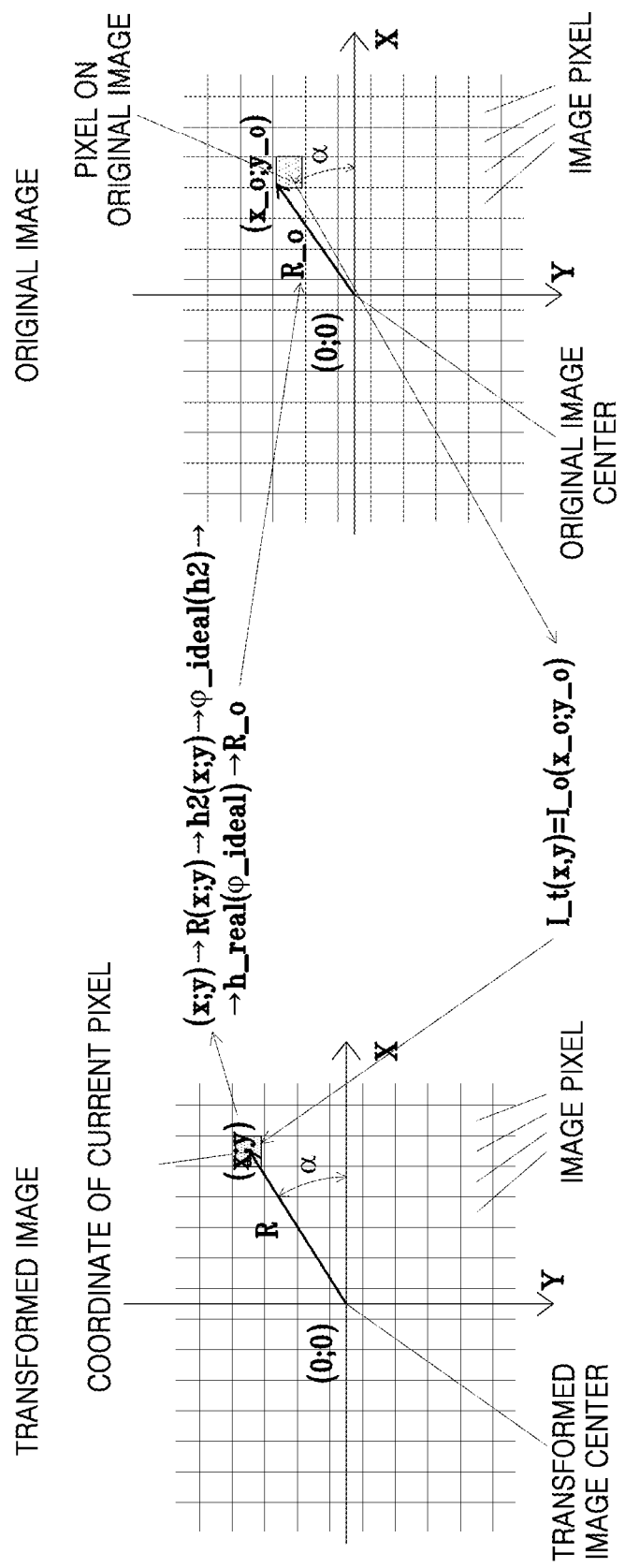
FIG. 18 illustrates the relationship between a transformed image and an original image.

FIG. 18 illustrates the comparison between an original image and a transformed image. Referring to FIG. 18, an angular direction with respect to a pixel is as follows.

$$\alpha=\text{arctg}(y/x) \quad (16)$$

Then, the following may be obtained.

$$h2(x;y)=R(x;y) \quad (17)$$

The current ideal beam angle is as follows.

$$\varphi=\varphi\_\text{ideal}(h2) \quad (18)$$

$$\varphi\_\text{real}=\varphi \quad (19)$$

When the angle is known, the height may be determined as follows.

$$h1=h\_\text{real}((\varphi\_\text{real})) \quad (20)$$

The radius of the original image may be defined as follows.

$$R\_o=h1 \quad (21)$$

Figure 19:
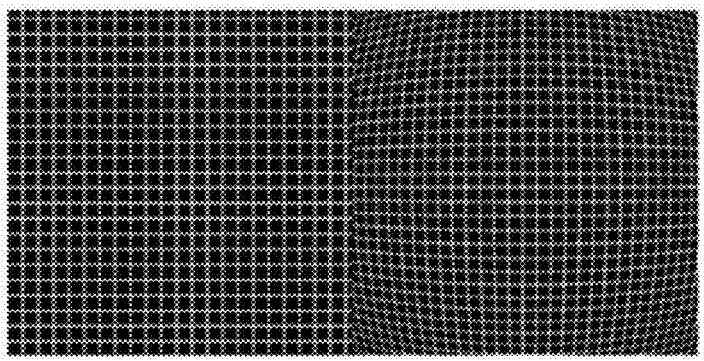
FIG. 19 illustrates the result of a pre-distortion algorithm.
Figure 19:
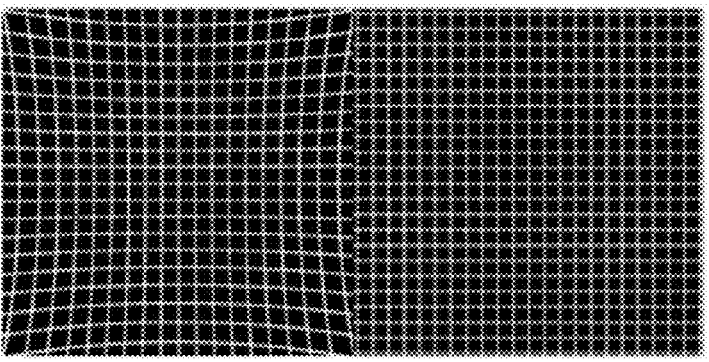

When the angle α is known, the coordinates (x_o;y_o) of the original image may be determined. Thus, the corresponding pixels of the original image and the transformed image may be obtained. Similarly, the ratio of all three colors may be determined and an image may be formed with chromatic aberration correction. l_t(x, y) may be generated based on linear, cubic interpolation, or other operations (see FIG. 19). Referring to FIG. 19, an original image and a transformed image are illustrated. A distortion in the opposite direction to the transformed image with respect to the original image may be pre-generated by the compound lens. Then, a distortion-compensated transformed image may be finally obtained.

Figure 20:
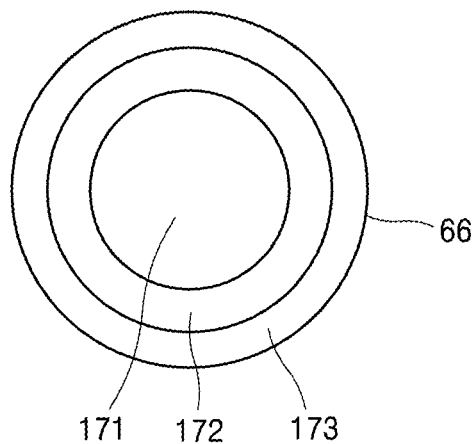
FIG. 20 illustrates a front view of a compound lens having three annular lens portions having different focal lengths.
Figure 21:
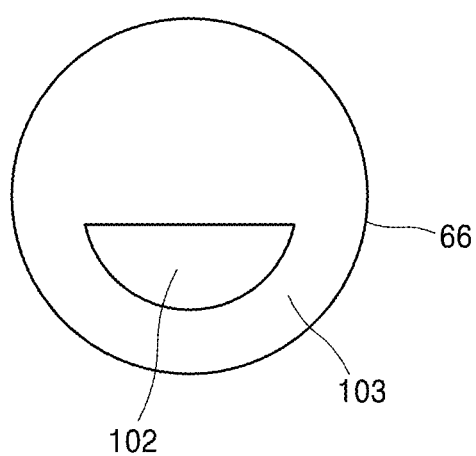
FIG. 21 illustrates a front view of a compound lens having an asymmetric lens portion.

In some embodiments, a compound lens may include more than two lens portions having different focal lengths (corresponding to pixel densities of image regions or different colors). When a smooth reduction of the resolution from the central image region to the peripheral image region is required, the number of lens portions should be increased. For example, FIG. 20 illustrates a front view of a multiple compound lens having three annular lens portions 171, 172, and 173 providing different resolutions. In order to continuously change the resolution, the number of lens portions should be infinite. In FIG. 20, the lens portions may be arranged concentrically. In order to have asymmetric resolution, the lens portions may be arranged in different manners. For example, a central lens portion 102 may be arranged at a lower portion of a compound lens 66, as illustrated in FIG. 21.

In order to achieve Equations (13) and (14), the lens surfaces 61 and 62 (see FIG. 4) of a compound lens may have different shapes and structures. One or both of a central lens portion and at least one peripheral lens portion may have spherical or aspherical surfaces. The most frequently used surface is a rotationally symmetric polynomial aspherical surface described by the following equation.

$$z = \frac{cr^2}{1+\sqrt{1-(1+k)c^2r^2}} + \alpha_1 r^2 + \alpha_2 r^3 + \ldots + \alpha_{n-1} r^n \quad (22)$$

Herein, c denotes the curvature (the reciprocal of a radius), r denotes the radius, k denotes a conic constant, $\alpha_1$-$\alpha_{n-1}$ denotes an aspherical coefficient, and n denotes the order of a term.

When k=0, $\alpha_1=\alpha_2=\ldots=\alpha_{n-1}=0$, Equation (15) represents a spherical surface.

In a general case, for example, for better aberration correction, the lens surfaces 61 and 62 may have a free form that is described by an equation corresponding to an array of point coordinates.

Equation (10) may be achieved by applying a medium with a refractive index gradient as well as other surface forms.

$$n=n_0+n_{1r}r+n_{2r}r^2+\ldots+n_{ur}r^\mu+n_{1z}z+n_{2z}z^2+\ldots+n_{v2}r^v \quad (23)$$

Herein, $n_0$ is a base refractive index, r is a radius, z is an axial coordinate, $n_{1r}$-$n_{ur}$ are radial terms, $n_{1z}$-$n_{vz}$ are axial terms, and u and v are the corresponding numbers of radial terms and axial terms.

Figure 22:
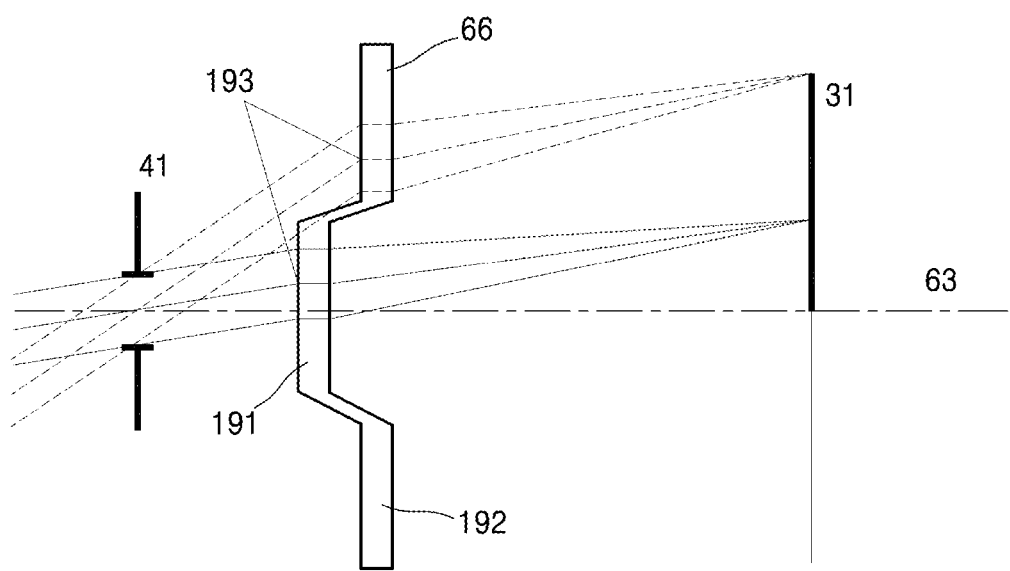
FIG. 22 illustrates a compound lens including two annular diffractive elements.

Another method of satisfying Equation (10) is to use a diffractive optical element instead of a refractive surface. FIG. 22 illustrates an operation principle of a compound lens 66 including two lens portions including first and second annular diffractive elements 191 and 192. The focal length of the element 191 may be greater than the focal length of the element 192. The first and second annular diffractive elements 191 and 192 may represent a Fresnel lens. The structure of the first and second annular diffractive elements 191 and 192 may be obtained by the interference of two electromagnetic waves (two component beams). They may be holographic elements. In this case, the first and second annular diffractive elements 191 and 192 may deflect rays according to the following equation.

$$\hat{n} \times (r'_o - r'_r) = \frac{m\lambda_p}{\lambda_c} \hat{n} \times (r_o - r_r) \quad (24)$$

Herein, n is a unit vector perpendicular to the hologram surface of a diffractive element at a ray intersection 193, $r_o$ is a unit vector according to a first structural beam, $r_r$ is a unit vector according to a second structural beam, and $r_r'$ is a unit vector according to an incident beam, $r_0'$ is a unit vector according to a refracted ray, λc is a structure wavelength, Δρ is a wavelength irradiated by the display 31, and m is a diffraction order.

Figure 23:
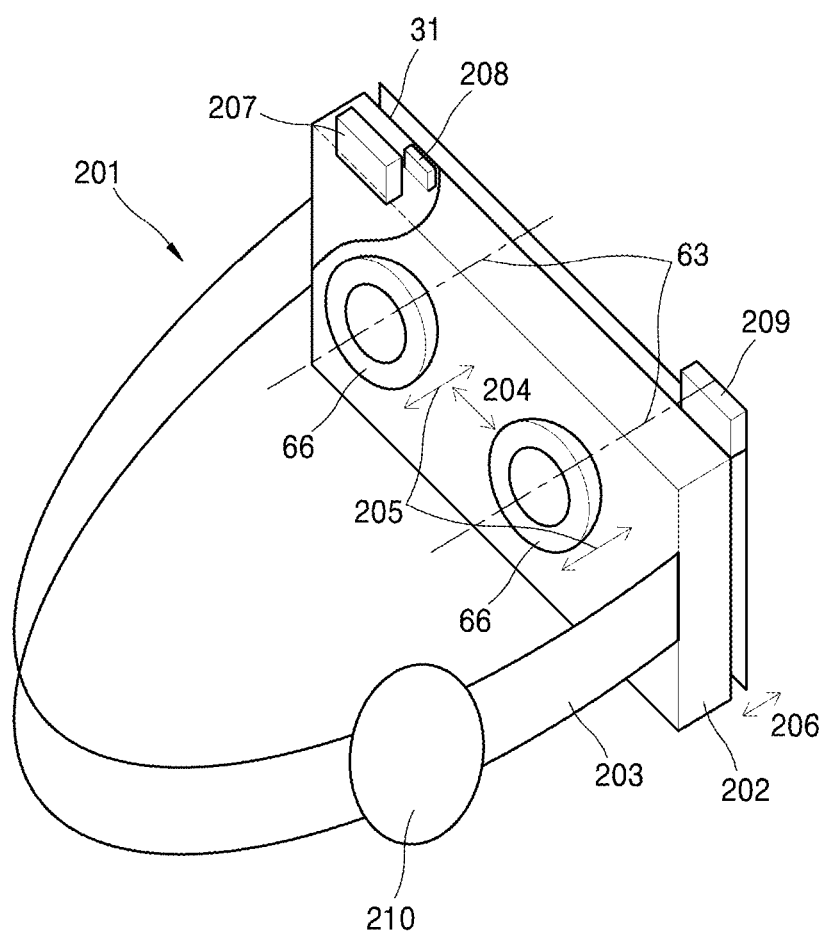
FIG. 23 illustrates a display device according to an example embodiment.

FIG. 23 illustrates an example in which a compound lens according to an example embodiment is applied to a display device (e.g., virtual reality device) 201. In order to provide a binocular disparity, two compound lenses 66 may be provided. The display 31 may be used in common for both the compound lenses 66, or each lens may have the display 31. A display of a smart phone or another mobile device may be used instead of the built-in display 31. The display 31 and the compound lens 66 may be mounted in a frame 202. The frame 202 may have a fixing member 203 for fixing the display device 201 to the head of a user. The fixing member 203 may be implemented as an earphone. A first adjuster 204 capable of moving the compound lens in a direction perpendicular to the optical axis 63 may be provided to adjust the display device 201 to the distance between both eyes of the user. Some users may have eye refraction problems (refraction errors) such as myopia and hyperopia. In order to compensate for such eye refraction errors, the display device 201 may have an additional adjuster for causing the compound lens 66 to move along the optical axis 63. The same function may be implemented by a second adjuster 206 for allowing the user to move the display 31.

The display device 201 may further include an integrated processor 207, a wireless radio interface 208, an optical interface 209, and an audio interface 210. The integrated processor 207 may process interactive content for display to the user. The wireless radio interface 208 may transmit/receive interactive content through radio waves. The optical interface 209 may capture or relay the interactive content. The optical interface 209 may be mounted in the frame 202 and may be configured to capture and relay an image. The processor 207 may be configured to select an image captured by an optical interface for display to a viewer through the display. The optical interface 209 may be implemented by a camera, a camcorder, or a projection lens. The audio interface 210 may transmit/receive interactive content through sound waves. The audio interface 210 may be implemented by a microphone, a dynamic transducer, a bone conduction transducer, or the like.

An example display device may be made in the form of a helmet. The display may be a screen of a mobile device.

These applications are easy for the virtual reality device 201 with the compound lens 66 according to an example embodiment. When there is no built-in display, it may be sufficient to insert a mobile phone into a headset. In order to compensate for eye defects such as myopia and hyperopia, a user may start a software application to be immersed in virtual reality. An implementable viewing angle may make this reality possible regardless of whether it is a game, a movie, or a training simulator. Since users may accurately see minute details about the real world, the lack of screen door effects and high realizable resolutions enable realistic presence. The user will be completely immersed in the virtual reality when previewing a movie through the device 201 in 3D of theater size scale with high resolution.

Figure 24:
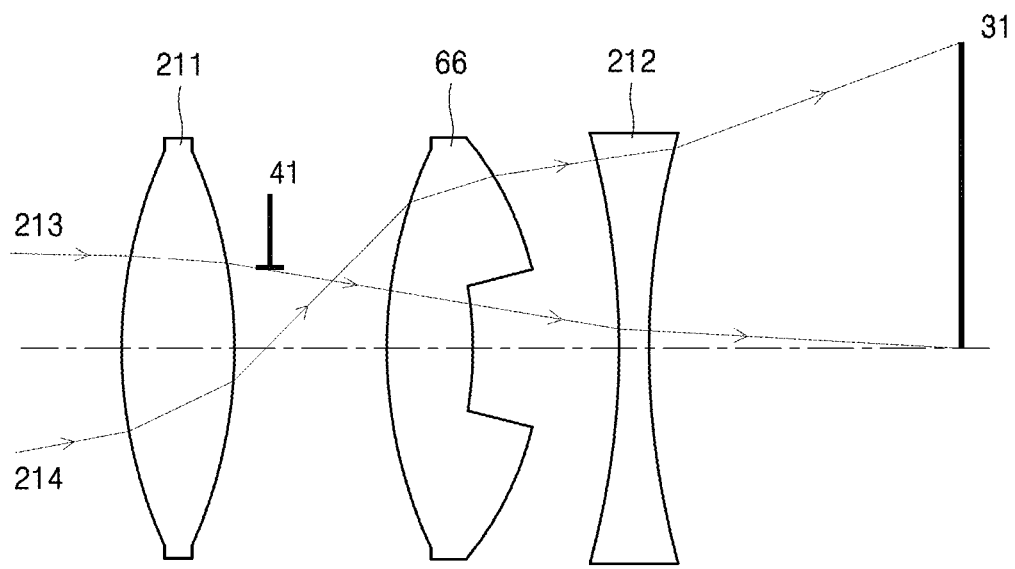
FIG. 24 illustrates an optical system of a compound lens according to an example embodiment.

The proposed lenses may be used not only in virtual reality devices but also in devices that are necessary to redistribute the resolution through the viewing angle (FOV). For example, FIG. 24 illustrates the application of a compound lens 66 in an optical system of a video camera. The optical system may further include one or more other optical elements in addition to the compound lens 66. Two lenses, for example, a positive lens 211 and a negative lens 212 may be used in an example. The paths of a peripheral ray 213 and a chief ray 214 are illustrated in FIG. 24. An image sensor, for example, a device based on Charged-Coupled Device (CCD) or Complementary Metal Oxide Semiconductor (CMOS) technology may be used instead of the display 31. The video camera may increase the resolution in a central image region. These devices may be used for security applications. For example, a camera with a wide angle may have a high resolution to identify an object and may have two image regions in a viewing angle with a low resolution to detect a suspicious object. When a suspicious object is in the wide angle, it is marked by a mark indicating the position of the suspicious object, and then the camera rotates around the object and the object is placed in the central image region with a high resolution where the object is identified.

Let's consider an example of the design of a compound lens for a virtual reality device with parameters in Table 1.

TABLE 1

| | |
|---|---|
| Display | 5.1" WQHD (2560 × 1440), 112.6 × 63.36 mm |
| Pixel Size | 44 μm |
| Pupil Diameter | 8 mm |
| Eye Relief | 10.0 mm |

TABLE 1-continued

| | | |
|---|---|---|
| Focal Length | 47 mm | |
| F/# (Focal Number) | 6 | |
| Diopter Range | −9D~6D | |
| Lens Diameter | 37 mm | |
| Angular Resolution | On-Axial | 18 pixel/degree |
| | Edge of the field of view | 8 pixel/degree |

Figure 25:
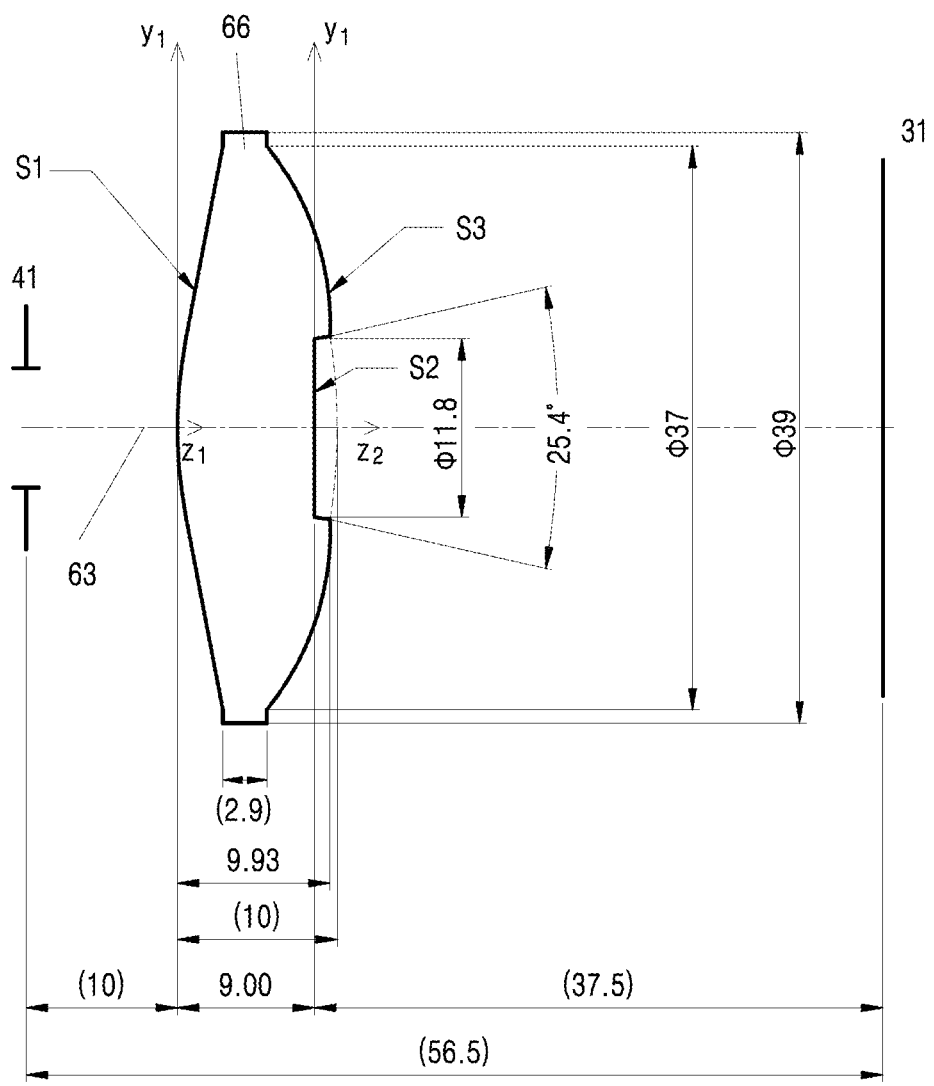
FIG. 25 illustrates the dimensions of a compound lens according to an example embodiment.

A compound lens 66 according to an example embodiment is illustrated in FIG. 25. Particular dimensions of the compound lens 66 are indicated in FIG. 25. The compound lens 66 may be made of polymethyl methacrylate (PMMA). However, the present disclosure is not limited thereto, and the compound lens may include other optical systems such as glasses and optical plastics. The compound lens 66 may include, for example, first, second, and third aspherical surfaces S1, S2, and S3, and the first, second, and third aspherical surfaces S1, S2, and S3 may be described by coordinates $y_1 z_1$ and $y_2 z_2$ by the following equation.

The first aspherical surface S1 may be an incidence surface of the compound lens 66 and may be represented as follows.

$$z_1 = \frac{cy_1^2}{1 + \sqrt{1 - (1+k)c^2 y_1^2}} + Ay_1^4 + By_1^6 + Cy_1^8 + Dy_1^{10} + Ey_1^8 + Fy_1^{10} + Gy_1^{12} \quad (25)$$

Herein, k denotes a conic constant, and c denotes a curvature.

The second aspherical surface S2 may be an exit surface of a central lens portion of the compound lens 66 and may be represented as follows.

$$z_2 = \frac{cy_2^2}{1 + \sqrt{1 - (1+k)c^2 y_2^2}} + Ay_2^4 + By_2^6 + Cy_2^8 + Dy_2^{10} + Ey_2^8 + Fy_2^{10} + Gy_2^{12} \quad (26)$$

The third aspherical surface S3 may be an exit surface of a peripheral lens portion of the compound lens 66 and may be represented as follows.

$$z_2 = \frac{cy_2^2}{1 + \sqrt{1 - (1+k)c^2 y_2^2}} + Ay_2^4 + By_2^6 + Cy_2^8 + Dy_2^{10} + Ey_2^8 + Fy_2^{10} + Gy_2^{12} + 1 \quad (27)$$

Coefficients c, k, A, B, C, D, E, F, and G are illustrated in Table 2.

TABLE 2

| | S1 | S2 | S3 |
|---|---|---|---|
| c | 0.04146 | −0.00215 | −1.35232E−03 |
| k | −0.43513 | 0.02454 | 0.00175 |
| A | −7.97548E−05 | −3.34598E−05 | −3.05666E−05 |
| B | 1.03156E−07 | −5.01220E−08 | −4.69571E−08 |
| C | 5.48528E−10 | 1.42666E−10 | 1.14424E−10 |
| D | −3.48613E−12 | 0 | 0 |
| E | 9.46143E−15 | 0 | 0 |
| F | −1.33E−17 | 0 | 0 |

TABLE 2-continued

| | S1 | S2 | S3 |
|---|---|---|---|
| G | 6.85E-21 | 0 | 0 |

The compound lens 66 illustrated in FIG. 25 may be arranged in front of each eye of the user. Both lenses corresponding to the left eye and the right eye may be applied to a display 31 having a WGHD resolution (2560× 1440) and a 5.1" diagonal line. Each lens may project the half of an image displayed by the display 31. The display 31 may move along the optical axis 63 in the range of about 20 mm from the normal position to provide an eye's refraction error correction in the range of about −9 diopters to about 6 diopters.

Figure 26:
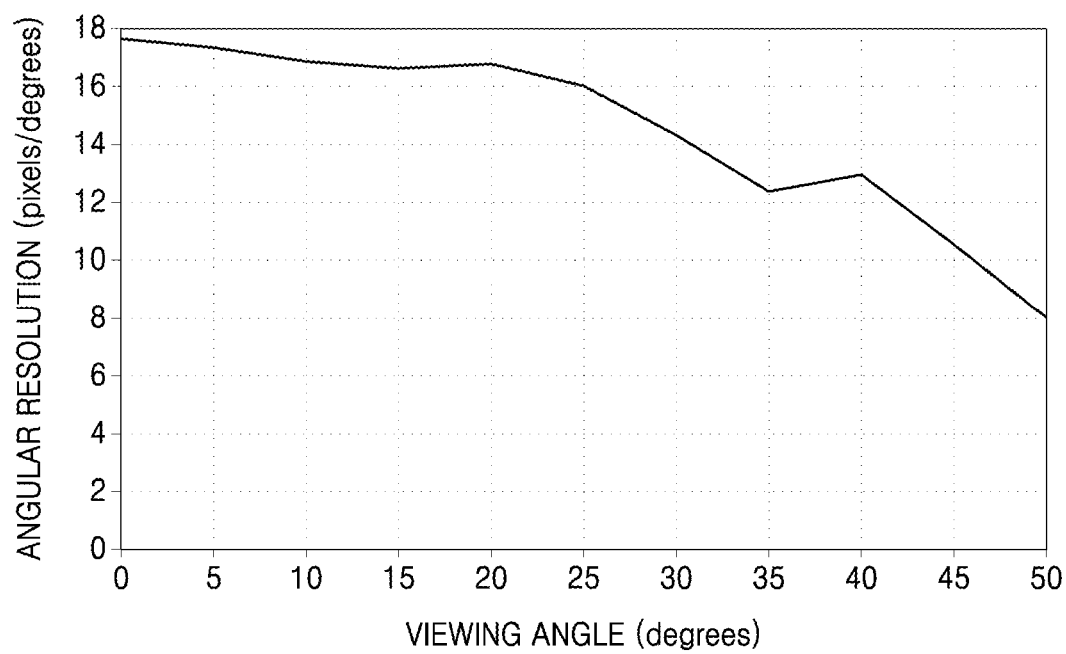
FIG. 26 illustrates the dependence of an angular resolution on a viewing angle.
Figure 27:
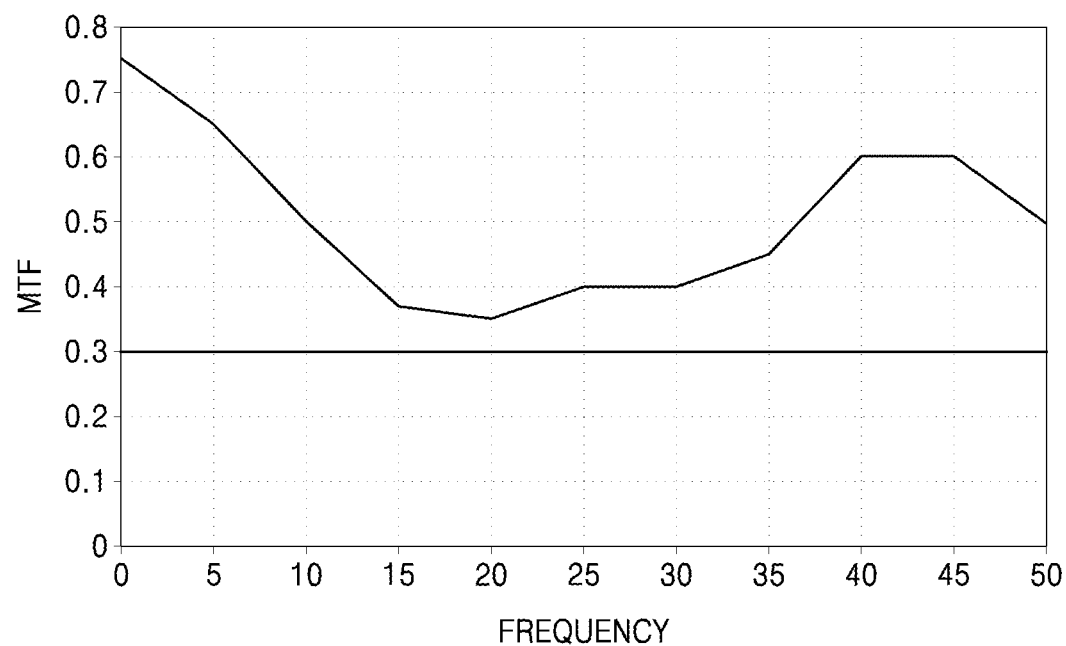
FIG. 27 illustrates the dependence of a modulation transfer function (MTF) on a frequency.

FIG. 26 illustrates an angular resolution depending on a viewing angle (FOV). FIG. 27 illustrates a modulation transfer function (MTF) depending on a frequency (f) defined by the following equation.

$$f = 11 \frac{\varphi}{\varphi_{eye}} \tag{28}$$

Herein, $\varphi$ is the angular resolution (see FIG. 26), and $\varphi_{eye}$ is the resolution of human eyes (see FIG. 1).

Figure 28:
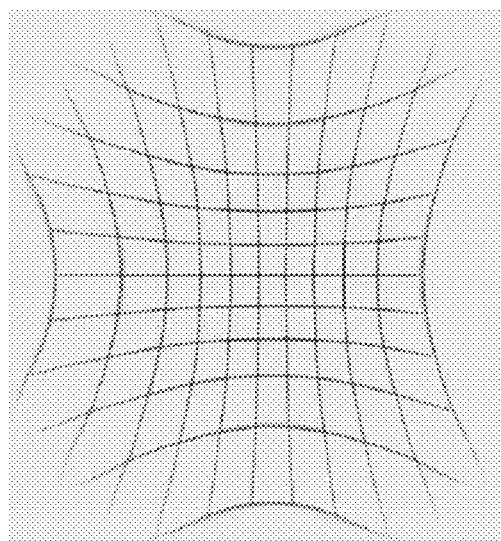
FIG. 28 illustrates a distortion grid formed by a compound lens according to an example embodiment.

FIG. 28 illustrates a distortion grid formed by a compound lens, which is seen by the eyes. In order to compensate for the distortion, an image on the display may be pre-distorted. In order to compensate for this, the algorithm described above may be used.

In an example embodiment, at least one of a central lens portion and at least one peripheral lens portion may be coated with a thin film to improve the performance of a compound lens. For example, the thin film may be an anti-reflection film used to increase the lens transmittance.

A compound lens according to an example embodiment may be used for image projection, video recording, and photographing.

A compound lens according to an example embodiment may include a central lens portion and at least one peripheral lens portion. The central lens portion and the at least one peripheral lens portion may have different focal lengths. That is, the focal length of the central lens portion may be greater than the focal length of the at least one peripheral lens portion. The central lens portion and the at least one peripheral lens portion may be arranged to have coincident focal planes. For example, the central lens portion and the at least one peripheral lens portion may have concentric focal planes. This arrangement may be performed by combining different types of lenses as described above. The main idea of compound lenses according to various embodiments is to have a central lens portion having a relatively greater focal length to provide a higher image resolution (or higher pixel density) in a central image region on the screen. Since the peripheral lens portion has a relatively smaller focal length, the at least one peripheral lens portion may provide a lower image resolution (or lower pixel density) in a peripheral image region on the screen. Thus, the viewer may feel as being in the scene displayed in the image.

A compound lens according to an example embodiment may include a central lens portion and a plurality of peripheral lens portions surrounding the central lens portion. The plurality of peripheral lens portions may have a focal length fi (where "i" is the number of peripheral lens portions and i=1, 2, 3, . . . n) and satisfy $f_0 > f_1 > f_2 > f_3 > \ldots > f_n$ (where $f_0$ is the first focal length of the central lens portion), and the central lens portion and the plurality of peripheral lens portions may have coincident focal planes.

The compound lenses according to various embodiments may be applied to exhibitions, museums, movies, concerts, sports halls, stadiums, sports stadiums, and the like. Also, the compound lenses may be applied in other places where it is necessary to provide immersive presence simulations in the advertising industry, in cars, in games, and in virtual reality.

Although example embodiments of the present disclosure have been described above, various changes and modifications may be made therein without departing from the scope of protection defined by the following claims. In the appended claims, references to elements in singular form do not exclude the presence of a plurality of such elements unless explicitly stated otherwise.

The invention claimed is:

1. A compound lens comprising:
   a central lens portion having a first focal length; and
   at least one peripheral lens portion having a second focal length and surrounding the central lens portion,
   wherein the first focal length is greater than the second focal length,
   wherein the central lens portion comprises one of a biconvex lens, a biconcave lens, a positive meniscus lens, a negative meniscus lens, and a lens having two randomly-curved surfaces, and
   wherein the central lens portion provides a higher resolution in a central image region and the at least one peripheral lens portion provides a lower resolution in a peripheral image region.

2. The compound lens of claim 1, wherein the central lens portion and the at least one peripheral lens portion have concentric focal planes.

3. The compound lens of claim 1, wherein the central lens portion and the at least one peripheral lens portion comprise polymethyl methacrylate (PMMA), glass, or optical plastic.

4. The compound lens of claim 1, wherein the central lens portion has a circular shape and the at least one peripheral lens portion has an annular shape.

5. The compound lens of claim 1, wherein the central lens portion and the at least one peripheral lens portion are concentrically arranged.

6. The compound lens of claim 1, wherein the central lens portion and the at least one peripheral lens portion form a Fresnel lens together.

7. The compound lens of claim 1, wherein the at least one peripheral lens portion comprises any one of a biconvex lens, a biconcave lens, and a lens having two randomly-curved surfaces.

8. The compound lens of claim 1, wherein the central lens portion and the at least one peripheral lens portion comprise an optical diffractive element or an optical holographic element.

9. The compound lens of claim 1, wherein at least one of the central lens portion and the at least one peripheral lens portion is coated with an antireflection film configured to increase lens transparency.

10. The compound lens of claim 1, wherein the at least one peripheral lens portion comprises a plurality of peripheral lens portions surrounding the central lens portion,
   wherein the plurality of peripheral lens portions have a focal length fi where "i" is a number of peripheral lens portions and i=1, 2, 3, . . . n and satisfy $f_0 > f_1 > f_2 > f_3 > \ldots > f_n$ where f0 is the first focal length of the central lens portion, and the central lens portion and the plurality of peripheral lens portions have coincident focal planes.

11. A display device comprising:
a frame;
a processor mounted in the frame and configured to select an image to be displayed to a viewer;
a display attached to the frame and configured to display the image selected by the processor; and
two compound lenses,
wherein each of the two compound lenses comprises a central lens portion having a first focal length and at least one peripheral lens portion having a second focal length and surrounding the central lens portion, and the first focal length is greater than the second focal length.

12. The display device of claim 11, wherein the central lens portion and the at least one peripheral lens portion have concentric focal planes.

13. The display device of claim 11, further comprising a first adjuster configured to adjust an interocular distance for the viewer by moving a compound lens among the two compound lenses perpendicularly to an optical axis of the compound lens.

14. The display device of claim 11, further comprising a second adjuster configured to change a distance between the display and a compound lens among the two compound lenses to compensate for a refraction error of eyes of the viewer by moving the compound lens along an optical axis of the compound lens.

\* \* \* \* \*